United States Patent [19]

Steinemann

[11] 4,136,033
[45] Jan. 23, 1979

[54] 6-HYDROXYPYRIDONE-2 COMPOUNDS HAVING A CATIONIC GROUP IN THE 3-POSITION

[75] Inventor: Willy Steinemann, Basel, Switzerland

[73] Assignee: Sandoz Ltd., Basel, Switzerland

[21] Appl. No.: 483,041

[22] Filed: Jun. 25, 1974

Related U.S. Application Data

[63] Continuation-in-part of Ser. No. 87,602, Nov. 6, 1970, Pat. No. 3,852,261.

[30] Foreign Application Priority Data

Nov. 7, 1969 [CH] Switzerland ............... 16561/69
Dec. 23, 1969 [CH] Switzerland ............... 19042/69
Aug. 13, 1970 [CH] Switzerland ............... 12175/70
Aug. 18, 1970 [CH] Switzerland ............... 12339/70

[51] Int. Cl.² ............................ C07D 401/02
[52] U.S. Cl. ............................ 546/258; 544/80;
544/82; 544/295; 544/333; 544/122; 544/120;
544/130; 544/131; 544/116; 544/119; 544/128;
544/357; 544/363; 544/364; 544/353; 544/405;
544/298; 544/351; 546/257; 546/259; 546/193;
546/194; 546/256; 546/276; 546/144; 546/167;
546/277; 546/141; 546/153; 546/270; 546/271;
546/278; 546/279

[58] Field of Search ......... 260/296 D, 297 Z, 295 L,
260/250 N, 268 H, 283 CN, 287 R, 289 R,
294.9, 295 CA, 294.8 F, 294.8 D; 544/124

[56] References Cited

U.S. PATENT DOCUMENTS 3,852,261  12/1974  Steinemann ............... 260/156

FOREIGN PATENT DOCUMENTS 758636  4/1971  Belgium ............... 260/295 L

OTHER PUBLICATIONS

Thesing et al., Chem. Ber., vol. 90, pp. 711 to 723 (1957).
Thesing et al., Angew. Chem., vol. 68, pp. 577 to 578 (1956).
Klingsberg, Pyridine and Its Derivatives, Part I, frontispage and pp. 456 to 458, Interscience Publishers Inc., NY (1960).

Primary Examiner—John D. Randolph
Attorney, Agent, or Firm—Gerald D. Sharkin; Richard E. Vila; Melvyn M. Kassenoff

[57] ABSTRACT

Compounds of the formula

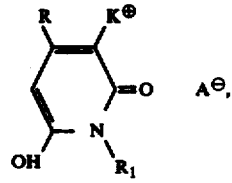

wherein
  $K^\oplus$ is a cationic group, preferably heterocyclic,
  R is hydrogen or an organic radical, preferably alkyl, phenyl or acyl,
  $R_1$ is hydrogen, hydrocarbyl, substituted hydrocarbyl, heterocyclyl, substituted heterocyclyl, amino or substituted amino, and
  $A^\ominus$ is an anion, are useful as intermediates in the synthesis of azo dyes of the formula

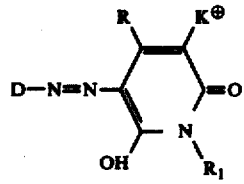

wherein D
  is an aromatic carbocyclic or heterocyclic diazo component radical, and
  $K^\oplus$, R, $R_1$ and $A^\ominus$ are as defined above.

27 Claims, No Drawings

6-HYDROXYPYRIDONE-2 COMPOUNDS HAVING A CATIONIC GROUP IN THE 3-POSITION

This application is a continuation-in-part of application Ser. No. 87,602, filed Nov. 6, 1970, and now U.S. Pat. No. 3,852,261.

This invention relates to new basic azo dyes free from sulphonic acid groups, which are formed with a dihydroxypyridine coupling component in which a cationic nitrogen atom is bound directly to the 3-position of the pyridone. They are highly suited for dyeing and printing of polyacrylonitrile and acrylonitrile copolymer fibres and textiles made thereof, including the component of such fibre in blend yarns and fabrics.

These new azo dyes have the formula

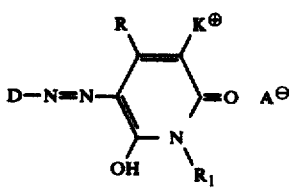

(I), where
D is an aromatic carbocyclic or aromatic heterocyclic radical which may be substituted,
R is hydrogen or an organic radical,
$R_1$ is hydrogen or for a hydrocarbon radical, a heterocyclic radical or an amino group which may be substituted,
$A^\ominus$ is an anion equivalent to the dye cation,
and $K^\oplus$ is a group of the formula

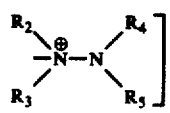

(II), (III), (IV).

In Formulae II, III and IV
$R_2$ is an alkyl or cycloalkyl radical which may be substituted or together with $R_3$ and the adjacent N atom is a heterocycle,
$R_3$ is an alkyl or cycloalkyl radical which may be substituted or together with $R_2$ and the adjacent N atom is a heterocycle,
each of $R_4$ and $R_5$ each is independently hydrogen or an alkyl or cycloalkyl radical which may be substituted,
each of $R_6$ and $R_7$ each is a hydrocarbon radical which may be substituted,
$R_8$ is an alkyl or cycloalkyl radical which may be substituted,
and where $R_2$ together with $R_4$ and/or $R_3$ together with $R_5$ and the N atoms adjacent to these substituents or $R_6$ and $R_7$ or $R_6$, $R_7$ and $R_8$ together with the $N^\oplus$ atom may form heterocycles.

The invention thus comprises azo dyes of the formula

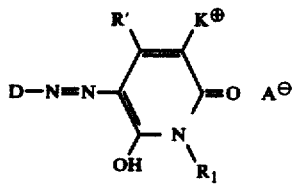

(V), where R' represents hydrogen or an alkyl, aryl or heterocyclic radical which may be substituted or a carboxylic acid ester or a carboxylic acid amide radical; and azo dyes of the formula

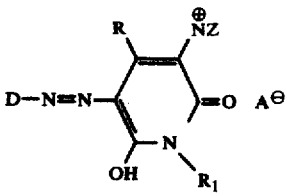

(VI), where R" represents an alkyl or aryl radical which may be substituted.

Azo dyes of notably good quality correspond to the formula

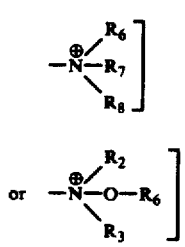

(VII), where
D is an aromatic carbocyclic or aromatic heterocyclic radical which may be substituted,
R is hydrogen or an organic radical,
$R_1$ is hydrogen or a hydrocarbon radical, a heterocyclic radical or an amino group which may be substituted,
$A^\ominus$ is an anion equivalent to the dye cation,
and
Z is a constituent of a multi-membered ring of aromatic character, for example having five or six members, which may bear further hetero atoms and substituents and on which further rings may be condensed.

The invention comprises in particular azo dyes as defined in the following.

Azo dyes of the formulae

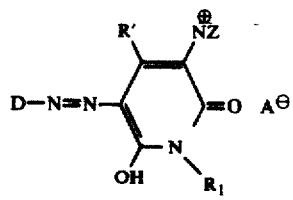

(VIII), where R' represents hydrogen, an alkyl, aryl or heterocyclic radical or a carboxylic acid ester or a carboxylic acid amide radical
and $R_1$, D, Z and $A^\ominus$ have the meanings assigned to them in the foregoing;

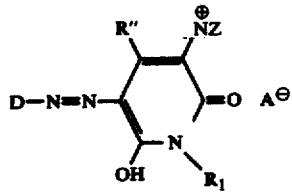
(IX), where R" represents an alkyl or aryl radical which may be substituted
and D, $R_1$, Z and $A^\ominus$ have the aforestated meanings;

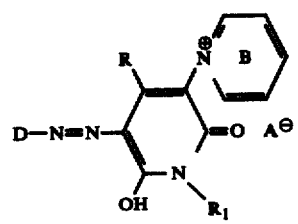
(X), where the pyridinium ring B may be unsubstitued or substituted; and D, R, $R_1$ and $A^\ominus$ have the aforestated meanings;

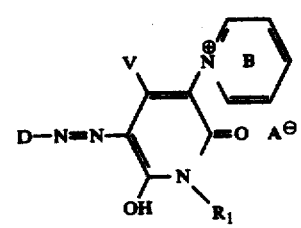
(XI), where V represents R' or R"
and D, $R_1$, B and $A^\ominus$ have the aforestated meanings;

(XII),

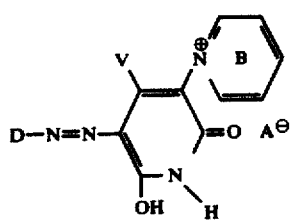

and (XIII).

The new azo dyes of Formulae I and VII can be produced by coupling a diazotized amine of the formula $$D - NH_2 \quad (XIV)$$

with a coupling component of the formula

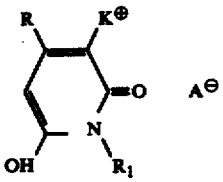
(XV)

or

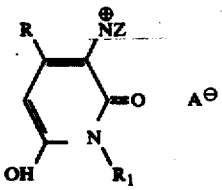
(XVI).

Disazo or polyazo dyes can be produced as desired.
Dyes of the formula

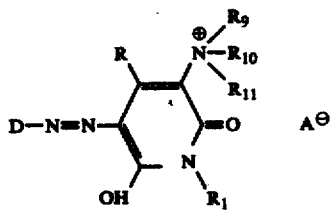
(XVII), where
each of $R_9$ and $R_{10}$ is a hydrocarbon radical which may be substituted, and
$R_{11}$ is an alkyl or cycloalkyl radical which may be substituted
and where $R_9$ and $R_{11}$ together with the $N^\oplus$ atom may form a saturated or partially saturated heterocycle, can be obtained by quaterinization of an azo compound of the formula

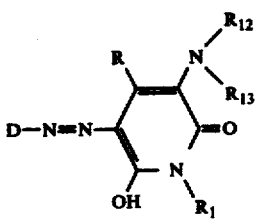
(XVIII), wherein each of
$R_{12}$ and $R_{13}$ is hydrogen or a hydrocarbon radical which may be substituted, or which, jointly with the N atom bound thereto, may form a saturated or partially saturated heterocycle.

An alternative method of producing these new dyes is to couple the diazo compound of an amine of Formula XIV with an acylacetic acid ester, e.g., acetoacetic acid methyl ester, by one of the known methods, and to react the resulting compound with a salt of an acetic amide bearing a cationic group, e.g., pyridinium acetamide chloride, in the presence of a catalyst in a solvent, preferably an organic solvent such as methanol.

The dyes of Formula I and Formula III can also be produced by oxidative coupling or the coupling of N- nitroso compounds of heterocyclic amines with a compound of Formula XV or XVI.

More particularly, this application relates to pyridones of the formula

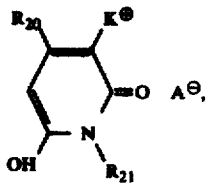 (XIX)

wherein

K⊕ is pyridinium, quinolinium, isoquinolinium, quinoxalinium, thiazolium, pyrimidinium, imidazolium, pyrazinium, benzoimidazolium, benzotriazolium, benzothiazolium, triazolium, tetrazolium, thiadiazolium, isoindazolium or 3-oxypyrazolinium, or a substituted derivative thereof wherein each substituent of each substituted derivative is independently lower alkyl, lower alkoxy, chloro, bromo, cyano, lower hydroxyalkyl, benzyl, phenyl or dilower alkylcarbamoyl, (preferably pyridinium, substituted pyridinium, quinolinium, substituted quinolinium, isoquinolinium or substituted isoquinolinium, more preferably wherein each substituted derivative has 1 to 3 substituents and each substituent is independently lower alkyl, methoxy, 2-hydroxyethyl, chloro, bromo, cyano, benzyl or dimethylcarbamoyl), $R_{20}$ is hydrogen, lower alkyl, lower alkyl monosubstituted by lower alkoxy, lower alkoxycarbonyl, lower alkylsulfonyl, cyano, phenoxy, phenyl, dilower alkylcarbamoyl, phenylcarbamoyl or pyrrolidinocarbonyl, phenyl, furyl, pyridyl, lower alkoxycarbonyl or

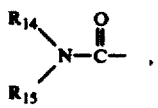

wherein each of $R_{14}$ and $R_{15}$ is independently hydrogen, alkyl of 1 to 6 carbon atoms, lower alkyl monosubstituted by hydroxy, phenyl, lower alkoxycarbonyl, lower alkoxy, cyano, morpholino, piperazino, tetrahydrofuryl or dilower alkylamino, phenyl, tolyl or lower alkoxy, or $R_{14}$ and $R_{15}$ taken together and with the nitrogen atom to which they are joined are pyrrolidino, piperidino, N'-lower hydroxyalkylpiperazino, hydrazino, N'-lower hydroxyalkylhydrazino or N',N'-dilower hydroxyalkylhydrazino, (preferably hydrogen, lower alkyl, phenyl, benzyl, lower alkoxymethyl, phenoxymethyl, lower alkoxycarbonyl or

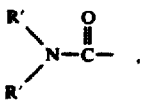

wherein each R' is independently hydrogen, alkyl of 1 to 6 carbon atoms, lower hydroxyalkyl, phenyl, o-tolyl or phenyl lower alkyl), $R_{21}$ is hydrogen, alkyl of 1 to 8 carbon atoms, lower alkyl monosubstituted by lower alkoxy, hydroxy, dilower alkylamino, lower hydroxyalkylamino, dilower hydroxyalkylamino, cyano, phenyl, lower alkoxycarbonyl, piperazino, N-lower alkylpiperazino, morpholino, pyridinium⊕ A⊖ or N,N-dilower alkylhydrazinium⊕ A⊖, phenyl, chlorophenyl, lower alkylphenyl, dilower alkylaminophenyl, anilinophenyl, diphenyl, lower alkylcarbamoyl, amino, dilower alkylamino, lower hydroxyalkylamino, pyrrolidino, morpholino, N'-lower alkylpiperazino, pyridyl, tetrahydrofuryl, lower alkylthiazolyl or N-lower alkylpyrrolidinium⊕ A⊖, (preferably hydrogen, lower alkyl, lower hydroxyalkyl, methoxy lower alkyl, phenyl or phenyl lower alkyl), and A⊖ is an anion.

The preferred compounds of Formula XIX are those wherein

K⊕ is pyridinium or substituted pyridinium having 1 or 2 substituents wherein each substituent is independently lower alkyl, methoxy, 2-hydroxyethyl, bromo, cyano, or N,N-dimethylcarbamoyl, $R_{20}$ is hydrogen, lower alkyl, phenyl, benzyl, lower alkoxycarbonyl or

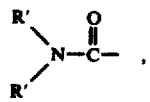

wherein each

R' is independently hydrogen, lower alkyl, lower hydroxyalkyl, phenyl or benzyl, and $R_{21}$ is hydrogen, lower alkyl, benzyl, lower hydroxyalkyl or methoxy lower alkyl, and especially those wherein K⊕ is pyridinium or substituted pyridinium having 1 or 2 substituents wherein each substituent is independently methyl or ethyl, $R_{20}$ is hydrogen, lower alkyl or phenyl, and $R_{21}$ is hydrogen, lower alkyl, lower hydroxyalkyl benzyl or 3-methoxypropyl.

The most preferred compounds of Formula XIX are those wherein

K⊕ is pyridinium, methylpyridinium or dimethylpyridinium, $R_{20}$ is methyl or phenyl, and $R_{21}$ is hydrogen, methyl, 1-hydroxypropyl-2, benzyl, 2-hydroxyethyl or 3-methoxypropyl.

A⊖ is preferably chloride.

Also preferred are the compounds of Formula XIX wherein

K⊕ is pyridinium, quinolinium, isoquinolinium, or pyridinium monosubstituted by methyl, ethyl, chloro, cyano or methoxy, $R_{20}$ is methyl, phenyl, ethoxycarbonyl or dimethylcarbamoyl, and $R_{21}$ is hydrogen, alkyl of 1 to 8 carbon atoms, lower alkyl monosubstituted by lower alkoxy, hydroxy, dilower alkylamino, lower hydroxyalkylamino, dilower hydroxyalkylamino, morpholino or N'-lower alkylpiperazino, phenyl, chlorophenyl, lower alkylphenyl, dilower alkylaminophenyl, amino, dilower alkylamino, lower hydroxyalkylamino, pyrrolidino, morpholino or N'-lower alkylpiperazino (preferably hydrogen, alkyl of 1 to 8 carbon atoms, 3-methoxypropyl, 2-hydroxyethyl, 2-diethylaminoethyl, 3-dimethylaminopropyl, 3-dibutylaminopropyl, 2-(2-hydroxyethylamino)ethyl, N,N-di-2-(2-hydroxyethyl)aminoethyl, 2-morpholinoethyl, 2-(N'-methylpiperazino)ethyl, phenyl, chlorophenyl, tolyl, dimethylaminophenyl, amino, dimethylamino, 2-hydroxyethylamino, pyrrolidino, morpholino or N'-methylpiperazino).

Of the foregoing group, the compounds wherein $K^\oplus$ is pyridinium or pyridinium monosubstituted by methyl, ethyl, chloro, cyano or methoxy, are particularly preferred.

In the dyes and intermediates of Formulae I, V, VI, VII, VIII, IX, X, XI, XII, XIII, XV, XVI, XVII, XVIII and XIX the anion $A^\ominus$ can be replaced by another anion, e.g., with the aid of an ion exchanger or by reaction with salts or acids, if necessary in more than one step, for example via the hydroxide or the bicarbonate.

The anion $A^\ominus$ may be an organic or inorganic ion, for example the ion of a halogen such as chloride, bromide or iodide, or a sulphate, disulphate, methylsulphate, aminosulphonate, perchlorate, carbonate, bicarbonate, phosphate, phosphorus molybdate, phosphorus tungstate, phosphorus tungstic molybdate, arylsulphonate such as benzenesulphonate, 4-methylbenzenesulphonate, oxalate, maleinate, acetate, propionate, lactate, succinate, chloroacetate, tartrate, methanesulfonate or benzoate ion, or complex anions such as that of zinc chloride double salts.

The meaning of "halogen" may be bromine, fluorine, or iodine, but it is preferably chlorine. Examples of organic radicals are hydrocarbon radicals including substituted or unsubstituted alkyl, cycloalkyl and aryl radicals, for example, cyclohexyl, alkylcyclohexyl and phenyl radicals.

The alkyl radicals may be straight or branched, may be interrupted by hetero atoms and usually bear 1 to 12, 1 to 6 or preferably 1 to 4 carbon atoms. If these radicals are substituted they contain, in particular, halogen atoms, hydroxyl or cyano groups or aryl radicals such as phenyl radicals; in such cases alkyl stands for an aralkyl radical, e.g., a benzyl radical. The alkoxy radicals may contain 1 to 6 or preferably 1 to 3 carbon atoms. All the radicals of aromatic character, especially the aromatic carbocyclic and aromatic heterocyclic ones such as aryl radicals, e.g., phenyl, naphthyl, tetrahydronaphthyl, pyridyl, quinolyl and tetrahydroquinolyl radicals, may bear substituents, especially non-water-solubilizing substituents such as halogen atoms, nitro, amino, cyano, thiocyano, hydroxyl, alkyl, alkoxy, trifluoroalkyl, trichloroalkyl, phenyl, phenoxy, alkylamino, dialkylamino, phenylamino, acyl, acyloxy, acylamino, e.g., acetylamino, benzoylamino, alkylsulphonyl, arylsulphonyl, sulphonic acid amide, sulphonic acid alkylamide, sulphonic acid dialkylamide, sulphonic acid arylamide groups, arylazo, e.g., phenylazo, diphenylazo, or the -COOH group.

The radicals $R_2$ and $R_3$, together with the adjacent $N^\ominus$ atom, may form a heterocycle, e.g., a pyrrolidine, piperazine, morpholine, aziridine or piperidine ring. The radical $R_2$, jointly with $R_4$ and/or the $R_3$ radical jointly with $R_5$ and the $N^\oplus$ atoms adjacent to these substituents, may form a saturated or unsaturated, preferably five- or six-membered heterocycle such as a pyrazolidine, pyridazine or pyrazoline ring, e.g., trimethylene pyrazolidine or tetramethylpyrazoline.

The radicals $R_6$ and $R_7$, $R_9$ and $R_{10}$, and similarly the radicals $R_{12}$ and $R_{13}$ or $R_{14}$ and $R_{15}$, together with the adjacent N atom, may form a saturated or partially saturated heterocycle, for example a pyrrolidine, piperidine, morpholine, aziridine or piperazine ring.

The radicals $R_6$, $R_7$ and $R_8$, together with the adjacent $N\oplus$ atom, may form a heterocycle, e.g., a group of the formula

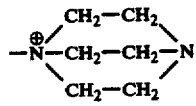

or may stand for a pyridinium ring.

The heterocyclic radicals R' and $R_1$ and the groups of the formula

may stand for the radicals of saturated, partly saturated or unsaturated multi-membered rings, preferably five- or six-membered rings, which may be substituted and on which further cycloaliphatic, heterocyclic or aromatic rings may be condensed. The group of the formula

may represent a pyridine, quinoline, isoquinoline, piperidine, pyrrolidine, morpholine, aziridine, piperazine, tetrahydroquinoline, pyrazole, triazole, pyridazine, imidazole, pyrimidine, thiazole, benzothiazole, thiadiazole, indazole, pyrrole, indole, indolenine, oxazole, isoxazole or tetrazole ring, and $R_1$ may represent a piperidine, pyrrolidine, morpholine, aziridine, piperazine, tetrahydroquinoline, pyridazine, pyrrole or indole ring.

The dyes of Formulae I and VII may bear, in addition to the cationic group $K\oplus$ or

further cationic groups, e.g., in the radical D and/or in the radical R or $R_1$. These cationic groups may be hydrazinium, ammonium, cycloimmonium or sulphonium groups. The dyes of these two formulae may also contain protonizable groups, e.g., in the radicals $R_1$ and/or R; the term "protonizable groups" refers to radicals containing nitrogen which add on a proton in acid, preferably mineral acid medium to form salts. These are defined in Belgian Pat. No. 733,186.

An example of an amino group which may bear substituents is a primary, secondary or tertiary amino group, such as that of the formula

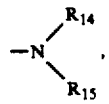

where $R_{14}$ and $R_{15}$ each represents hydrogen or a hydrocarbon radical or which, together with the N atom, may form a heterocycle, for example a saturated or partly saturated heterocycle.

The carboxylic acid ester radicals may be groups of the formula —COOX', where X' represents a substituted or unsubstituted hydrocarbon radical.

The carboxylic acid amide radicals stand primarily for a group of the formula

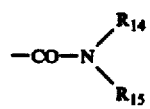

The —COOX' and

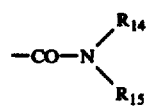

radicals are, as defined, bound directly on the pyridone ring.

The normal methods can be employed for coupling diazotized amines of Formula XIV with a coupling component of Formula XV, XVI or XIX, e.g., diazotization with sodium nitrite in hydrocholoric acid medium and coupling in aqueous-acid or aqueous-alkaline medium at temperatues of about $-10°$ C to room temperature. Quaternization can likewise be carried out by known methods, e.g., in an inert solvent, in aqueous suspension with the addition of solvent, or without solvent in an excess of the quaternization agent, if necessary at elevated temperatures and in buffered medium. It is advantageous to use organic acids, if necessary in conjunction with a basic compound.

Examples of quaternization agents are alkyl halides such as methyl and ethyl chloride, bromide and iodide, alkylsulphates such as dimethyl sulphate, benzyl chloride, acrylic amides/hydrochloride, e.g., $CH_2=CH-CO-NH_2/HCl$, chloroacetic acid alkyl ester, $\beta$-chloropropionic amide, epoxides such as ethylene oxide, propylene oxide, epichlorhydrin. The suitable quaternization agents include compounds of formula $R_{11}$—A.

The coupling components of Formulae XV, XVI and XIX can be produced by reacting a salt of an acetic acid amide bearing a cationic group, e.g., pyridinium acetamide chloride, with an acylacetic acid ester, e.g., acetoacetic acid methyl ester, in a solvent, preferably organic such as methanol, and in the presence of a catalyst.

Suitable catalysts are, for example, amines such as dimethyl amine, diethyl amine, piperidine, morpholine, and ammonium acetate, sodium acetate, potash, sodium carbonate and sodium hydroxide.

The new dyes are eminently suitable for dyeing and printing textiles which consist of polyacrylonitrile or acrylonitrile copolymer fibres or which contain a component of one of these fibres. They are suitable further for dyeing and printing synthetic polyamide and synthetic polyester fibres modified by the introduction of acid groups. Polyamides of this type are described, for example, in Belgian Pat. No. 706,104, while corresponding polyesters are disclosed, e.g. in United States Pat. Nos. 3,018,277 and 3,379,723.

The dyes are normally applied from an aqueous medium of neutral or acid reaction at temperatures in the range of $60°$ C to $100°$ C or at higher temperatures under static pressure. They give level dyeings without the assistance of retarders. As stated, they are well suited for dyeing the polyacrylonitrile or acrylonitrile copolymer fibre component of blend yarns and fabrics.

The dyes of this invention which have good solubility in organic solvents are suitable for the coloration of natural materials and natural resins in the mass, for the coloration of plastics materials and the dyeing of leather and paper.

On polyacrylonitrile and acrylonitrile copolymer fibres in particular, but also on other substrates, the dyes produce level dyeings showing good light and wet fastness. Notable features of these dyes are the high tinctorial strength and excellent covering power.

It has been found that mixtures of two or more of the new dyes and mixtures of these with other cationic dyes can be employed advantageously; the dyes are thus suitable for combination dyeing and cause no catalytic fading. The term "catalytic fading" refers to the type of fading shown by most yellow and greenish to reddish yellow dyes when dyed in combination with other dyes, in particular blue, violet or red dyes. It is due to interaction between the dyes and is more pronounced than the fading shown by dyeings of the single dyes.

The dyes of Formula I give dyeings with good fastness to washing, perspiration, sublimation, pleating, decatizing, pressing, steaming, water, sea water, dry cleaning, cross dyeing and solvents. They are readily soluble, especially in water, show good compatibility with salts, good pH-stability and withstand prolonged treatment at the boil. The dyes reserve natural and synthetic polyamide fibres, provided the latter have not been modified by the introduction of acid groups.

It can be assumed that the dyes with a dihydroxypyridone radical are present in a tautomeric state, which can be represented by the formula

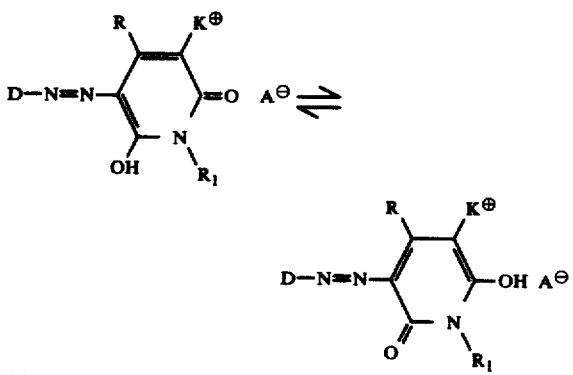

The dye of the formula

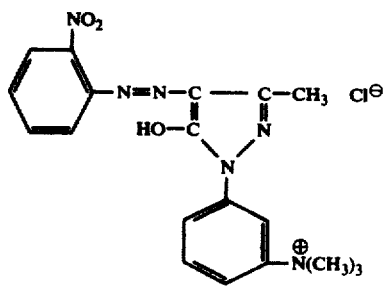

(a)

is disclosed in German published patent application No. 1,040,152 for the dyeing of polyacrylonitrile fibres, on which it gives yellow shades. It is surprising that the dyes of Formulae I and VII which are also of yellow shade, dye polyacrylonitrile fibres to considerably greater depth. Both in dye (a) and in the dyes of Formulae I and VII the cationic group is bound directly to a ring.

The intermediate compounds of Formulae XV, XVI and XIX are suitable for varied purposes. They can be employed as optical brighteners and insecticides and as intermediates for the production of optical brighteners and insecticides.

In the following Examples the parts and percentages are by weight and the temperatures in degrees centigrade.

EXAMPLE 1

9.3 Parts of aniline are diazotized by the normal method in 150 parts of 8 % hydrochloric acid. A solution of 25 parts of 2-keto-3-pyridinium chloride-4-methyl-6-hydroxy-1,2-dihydropyridine (prepared by reacting pyridinium chloride acetamide with acetoacetic acid methyl ester in methanolic sodium hydroxide solution) in 150 parts of water is added dropwise at 0°. At the same time 100 parts of a 12.5 % aqueous sodium acetate solution are added. After completion of coupling, the temperature is increased to 40°, hydrochloric acid is added to adjust to a mineral acid reaction, and the dye, which is present in the form of the chloride, is salted out and filtered. It can be purified by recrystallization. After drying and grinding it is obtained as a water-soluble powder which dyes polyacrylonitrile and acrylonitrile copolymer fibres in yellow shades of outstanding light fastness.

Dyeing Method

A mixture of 1 part of the dye of Example 1 and 80 parts of dextrin is ground in a ball mill for 48 hours. One part of the resulting dyeing preparation is pasted with 1 part of 40 % acetic acid, 400 parts of distilled water at 60° are run into the paste with constant stirring and the suspension is boiled for a short time. The solution formed is diluted with 7600 parts of distilled water, with the subsequent addition of 2 parts of glacial acetic acid. Into this dyebath 100 parts of a polyacrylonitrile fabric are entered at 60°, after pretreatment for 10–15 minutes at 60° in a bath of 8000 parts of water and 2 parts of glacial acetic acid. The dyebath is raised to 100° in 30 minutes and the fabric dyed for 1 hour at this temperature, with subsequent rinsing. A level yellow dyeing of excellent light and very good wet fastness is obtained.

EXAMPLE 2

14.15 Parts of 1-amino-3-chloro-4-methylbenzene are diazotized with 6.9 parts of sodium nitrite. A solution of 25 parts of 2-keto-3-pyridinium chloride-4-methyl-6-hydroxy-1,2-dihydropyridine (prepared by reacting pyridinium chloride acetamide with acetoacetic acid methyl ester in iso-propanolic sodium hydroxide solution) in 200 parts of water is dropped into the ice-cold diazo solution. 15 Parts of crystallized sodium acetate are gradually added to the coupling solution. Stirring is continued at 0-20° and then at 40°, with the addition of hydrochloric acid to obtain a mineral acid reaction. The new dye is salted out by adding common salt and purified by recrystallization. A yellow water-soluble powder is obtained which gives level, fast-to-light yellow dyeings on polyacrylonitrile fibres.

Dyes of comparably good quality are obtained when the 14.15 parts of 1-amino-3-chloro-4-methylbenzene employed in the foregoing Example are replaced by an equivalent amount of one of the following amines and the procedure of this Example followed :

1-aniline
1-amino-2-chlorobenzene
1-amino-3-chlorobenzene
1-amino-2,6-dichlorobenzene
1-amino-2,3-dichlorobenzene
1-amino-2,5-dichlorobenzene
1-amino-2,4-dichlorobenzene
1-amino-3,4-dichlorobenzene
1-amino-3,5-dichlorobenzene
1-amino-4-acetaminobenzene
1-amino-2-chloro-4-acetaminobenzene
1-amino-4-benzoylaminobenzene
1-amino-4-phenylbenzene
4-amino-1,1'-diphenylether
4-amino-4'-chloro-1,1'-diphenylether
2-amino-4'-chloro-1,1'-diphenylether
2-amino-1,1'-diphenylether
1-amino-2-chloro-4-methylsulphonylbenzene
1-amino-4-methylsulphonylbenzene
1-aminobenzene-3-sulphonic acid phenyl ester
1-aminobenzene-4-sulphonic acid phenyl ester
1-amino-2-chlorobenzene-5-sulphonic acid phenyl ester
1-amino-2-methylbenzene-5-sulphonic acid phenyl ester
1-amino-2,6-dichlorobenzene-4-sulphonic acid phenyl ester
1-amino-3-trifluoromethylbenzene
1-amino-3,5-di-(trifluoromethyl)-benzene
1-amino-2-trifluoromethyl-4-chlorobenzene
1-amino-4-carbethoxyaminobenzene
1-amino-2,5-dimethoxy-4-carbethoxyaminobenzene
1-aminonaphthalene
1-aminonaphthalene-4-sulphonic acid dimethylamide
4-aminophenyl-phthalimide
2-aminoterephthalic acid dimethylester
4-aminobenzophenone
4-amino-4'-methylbenzophenone
1-amino-4-acetylbenzene
4-amino-2', 4'-dinitrodiphenylamine
4amino-4'-nitrodiphenylamine
4-amino-2'-nitrodiphenylamine
2aminothiazole
2-amino-5-methoxybenzothiazole
1-amino-2-methylbenzene
1-amino-3-methylbenzene
1-amino-4-methylbenzene
1-amino-2,5-dimethylbenzene
1-amino-2-methyl-3-chlorobenzene
1-amino-2-methyl-6-chlorobenzene
1-amino-2-methyl-5-chlorobenzene
1-amino-2chloro-4-methylbenzene
1-amino-3-chloro-4-methylbenzene
1-amino-3,6-dichloro-4-methylsulfamoylbenzene
1-amino-2-chloro-4-nitrobenzene
1-amino-2-bromo-4-nitrobenzene
1-amino-2,5-dichloro-4-methoxybenzene
1-amino-2-methoxybenzene
1-amino-4-methoxybenzene
1-amino-2,5-dimethylbenzene
1-amino-2-methyl-3-chlorobenzene
1-amino-2-methyl-6-chlorobenzene
1-amino-2-methyl-5-chlorobenzene 1-amino-2-chloro-4-methylbenzene
1-amino-3-chloro-4-methylbenzene
1-amino-3,6-dichloro-4-dimethylsulfamoylbenzene
1-amino-2-chloro-4-nitrobenzene
1-amino-2-bromo-4-nitrobenzene
1-amino-2,5-dichloro-4-methoxybenzene
1-amino-2-methoxybenzene
1-amino-4-methoxybenzene
1-amino-3-chloro-4-methoxybenzene
1-amino-2-ethoxybenzene
1-amino-4-ethoxybenzene
1-amino-4-benzoxybenzene
1-aminophenylacetamide
1-aminophenylacetanilide
1-amino-2-cyanobenzene
1-amino-4-cyanobenzene
1-amino-3-cyanobenzene
1-amino-2-cyano-4-nitrobenzene
1-amino-2-cyano-4-nitro-6-bromobenzene
1-amino-2-nitro-4-methylbenzene
1-amino-2-nitro-4-chlorobenzene
1-amino-2,5-dimethyoxy-4-chlorobenzene
1-amino-2,5-dimethoxy-4-bromobenzene
1-amino-2,5-dimethoxybenzene
1-amino-2,5-diethoxybenzene
1-amino-2,5-dimethoxy-4-acetaminobenzene
1-amino-2,5-dimethoxy-4-benzoylaminobenzene
1-amino-2,5-diethoxy-4-benzoylaminobenzene
1-aminobenzene-4-sulphonic acid methylamide
1-aminobenzene-4-sulphonic acid dimethylamide
1-aminobenzene-4-sulphonic acid phenylamide
1-aminobenzene-4-sulphonic acid -2'-chlorophenylamide
1-aminobenzene-3-sulphonic acid phenylamide
1-aminobenzene-2-sulphonic acid-N-ethylphenylamide
1-amino-2-methyl-5-sulfamoylbenzene
1-amino-4-methylbenzene-3-sulphonic acid N-ethylphenylamide
1-amino-4-methylbenzene-3-sulphonic acid phenylamide
1-amino-2,5-dichlorobenzene-4-sulphonic acid phenylamide
1-amino-3-nitrobenzene
1-amino-4-nitrobenzene
1-amino-2-methoxy-4-nitrobenzene
1-amino-2,5-dimethoxy-4-nitrobenzene
1-amino-2,5-dinitrobenzene
1-aminobenzene-4-carboxylic acid methyl ester
1-aminobenzene-4-carboxylic acid ethyl ester
1-amino-2-methylbenzene-4-carboxylic acid ethyl ester
1-amino-2-methylbenzene-4-carboxylic acid phenylamide
1-aminobenzene-4-carboxylic acid phenylamide
1-aminobenzene-4-carboxylic acid dimethylamide
1-aminobenzene-4-carboxylic acid amide
1-aminobenzene-2-carboxylic acid amide
1-amino-4-chlorobenzene-2-carboxylic acid methyl ester
1-aminobenzene-2-carboxylic acid methyl ester
1-aminobenzene-3-carboxylic acid methyl ester
1-aminobenzene-3-carboxylic acid phenylamide
1-amino-3-nitro-4-methylbenzene
1-amino-2-nitro-4-methoxybenzene
2-aminobenzothiazole-6-sulphonamide
2-aminoanthraquinone
4-aminoazobenzene
1-amino-3-acetaminobenzene
1-aminobenzene-4-sulphonic acid naphthyl-(1)-amide
2-(4'-amino)-phenyl-6-methylbenzothiazole
3-amino-1,2,4-triazole
1-amino-2-nitro-4-methylbenzene
1-amino-2,4,6-trichlorobenzene
1-amino-4-(ω-dimethylamino)-acetylbenzene
1-amino-2-nitro-4-acetaminobenzene
4-amino-2-methyl-5-methoxyazobenzene
4-amino-2,5-dimethoxyazobenzene
4-amino-4'-nitroazobenzene
4-amino-4'-acetaminoazobenzene
4-amino-4'-dimethylaminoazobenzen
1-amino-4'-phenylazonaphthalene
1-amino-2-ethoxy-4'-phenylazonaphthalene
4-amino-3'-methylazobenzene
4-amino-4'-methoxyazobenzene Dyes of similar good quality are obtained when the procedure of this example is followed using 1,4-dimethyl-3-pyridinium chloride-6-hydroxypyriodone, 3-pyridinium chloride-4-phenyl-2,6-dihydroxypyridine, 3-(2-methylpyridinium chloride)-4-methyl-2,6-dihydroxypyridine, 1-(2'-hydroxyethyl)-3-pyridinium chloride-4-methyl-6-hydroxypyridone-2, 1-(3'-methoxypropyl)-3-pyridinium chloride-4-methyl-6-hydroxypyridone-2 or 3-(2,6-dimethylpyridinium chloride)-4-methyl-2,6-dihydroxypyridine is employed as the coupling component.

EXAMPLE 3

14.15 Parts of 1-amino-2-methyl-3-chlorobenzene are diazotized in the known way with 6.9 parts of sodium nitrite. 28 Parts of 1,2',4-trimethyl-2-keto-3-pyridinium chloride-6-hydroxy-1,2-dihydropyridine (prepared by condensing acetoacetic ester with 2'-methylpyridinium chloride acetic acid methyl amide in ethanol in the presence of potassium hydroxide) are dissolved in 200 parts of water and the solution dropped into the ice-cold diazo solution. Sodium acetate is added and the reaction solution raised to 50°. The dye formed is precipitated from solution with sodium chloride. It is obtained as a yellow water-soluble powder which gives fast greenish yellow dyeings on polyacrylonitrile and acrylonitrile copolymer fibres. Comparably good dyes are obtained by following the procedure of this Example with the 14.15 parts of 1-amino-2-methyl-3-chlorobenzene replaced by an equivalent amount of one of the amines listed after Example 2. Other equally good dyes result when the 28 parts of 1,2', 4-trimethyl-2-keto-3-pyridinium chloride-6-hydroxy-1,2-dihydropyridine used in this Example are replaced by an equivalent amount of 1-(3"-methoxy)-n-propyl-2-keto-3&2'-chloro)-pyridinium chloride-4-methyl-6-hydroxy-1,2-dihydropyridine, 1-n-butyl-2-keto-3-(4'-ethyl)-pyridinium chloride-4-methyl-6-hydroxy-1,2-dihydropyridine, 1-(2"-ethyl)-hexyl-2-keto-3-(3'-cyano)-pyridinium chloride-4-methyl-6-hydroxy-1,2-dihydropyridine, 1-(2"-hydroxy)-ethyl-2-keto-3-(2'-methoxy)-pyridinium chloride-4-methyl-6-hydroxy-1,2-dihydropyridine, 1-(2"-N'-methyl-piperazinyl)-ethyl-2-keto-3-(2'-methyl)-pyridinium chloride-4carbethoxy-6-hydroxy-1,2-dihydropyridine, 1-(2"6-hydroxyethylamino)-ethyl-2-keto-3-(3'-methyl)-pyridinium chloride-4-methyl-6-hydroxy-1,2-dihydropyridine. The aforenamed coupling components can also be employed in the procedures of Examples 1, 2, 4, 5 and 6.

EXAMPLE 4

12.1 Parts of 1-amino-2,5-dimethylbenzene are diazotized by the known method with 6.9 parts of sodium nitrite. 42 parts of 1-(2''-ethyl)-hexyl-2-keto-3-quinolinium chloride-4-methyl-6-hydroxy-1,2-dihydropyridine (prepared by condensation of acetoacetic ester with quinolinium chloride acetic acid-2-ethylhexylamide in iso-propanol by means of magnesium oxide) are dissolved in 200 parts of water and the solution added dropwise to the ice-cold diazo solution. Sodium acetate is then added and the reaction solution raised to 45°. The dye formed is precipitated by the addition of sodium chloride and purified by recrystallization. A yellow water-soluble powder is obtained which dyes polyacrylonitrile and acrylonitrile copolymer fibres in fast yellow shades.

Dyes of equally good quality are obtained when the 12.1 parts of 1-amino-2,5-dimethylbenzene used in the foregoing Example are replaced by an equivalent amount of one of the amines named after Example 2 using the procedure of Example 4. Other valuable dyes can be produced by the same procedure using, in place of the 42 parts of 1-(2''-ethyl)-hexyl-2-keto-3-quinolinium chdloride-4-methyl-6-hydroxy-1,2-dihydro-pyridine, the equivalent amount of 1-methyl-2-keto-3-isoquinolinium chloride-4-methyl-6-hydroxy-1,2-dihydropyridine. These coupling components can also be employed in the other Examples.

EXAMPLE 5

12.3 Parts of 1-amino-4-methoxybenzene are diazotized by the normal method with 6.9 parts of sodium nitrite. 33 Parts of 1-phenyl-2-keto-3-pyridinium chloride-4-methyl-6-hydroxy-1,2-dihydropyridine (prepared by condensation of pyridinium chloride acetic anilide with acetoacetic ester in ethanol and sodium hydroxide) are dissolved in 200 parts of water and the solution dropped into the ice-cold diazo solution. Sodium acetate is gradually added with stirring at 0.5°, stirring being continued to completion of the reaction. The temperature is increased to 50° and the dye precipitated from solution with sodium chloride. It is obtained as a water-soluble powder which gives level yellow dyeings on polyacrylonitrile fibres.

Dyes of comparable quality can be produced by the procedure of the foregoing Example with the 12.3 parts of 1-amino-4-methoxybenzene replaced by an equivalent amount of one of the amines listed after Example 2. Other equally good dyes are obtainable by the same procedure using, in place of the 33 parts of 1-phenyl-2-keto-3-pyridinium chloride-4-methyl-6-hydroxy-1,2-dihydropyridine, an equivalent amount of 1-(2''-chloro)-phenyl-2-keto-3-pyridinium chloride-4-methyl-6-hydroxy-1,2-dihydropyridine or 1-(3''-methyl)-phenyl-2-keto-3-(2'-methyl)pyridinium chloride-4-methyl-6-hydroxy-1,2-dihydropyridine. The aforenamed coupling components can also be employed in Examples 1 to 4 and 6.

EXAMPLE 6

12.75 Parts of 1-amino-2-chlorobenzene are diazotized with 6.9 parts of sodium nitrite. 30 Parts of 1-dimethylamino-2-keto-3-pyridinium chloride-4-methyl-6-hydroxy-1,2-dihydro-pyridine (prepared by condensation of pyridinium chloride acetic acid-N',N'-dimethyl hydrazide with acetoacetic ester in the presence of magnesium oxide) are dissolved in 200 parts of water and the solution dropped into the ice-cold diazo solution. At the same time an aqueous sodium acetate solution is dropped in. After the coupling reaction is complete the dye formed is precipitated from solution with sodium chloride in the form of yellow water-soluble crystals. It gives fast yellow dyeings on polyacrylonitrile fibres.

Comparably good dyes can be produced by the procedure of this Example by replacing the 12.75 parts of 1-amino-2-chlorobenzene by an equivalent amount of one of the amines named after Example 2. Other equally good dyes are obtainable by this procedure using in place of the 30 parts of 1-dimethyl-amino-2-keto-3-pyridinium chloride-4-methyl-6-hydroxy-1,2-dihydropyridine, an equivalent amount of 1-amino-2-keto-3-pyridinium chloride-4-methyl-6-hydroxy-1,2-dihydropyridine, 1-pyrrolidinyl-2-keto-3-pyridinium chloride-4-methyl-6hydroxy-1,2-dihydropyridine, 1-pyrrolidinyl-2-keto-3-pyridinium chloride-4-methyl-6hydroxy-1,2dihydropyridine, 1-(N-methyl)-piperazinyl-2-keto-3-pyridinium chloride-4-methyl-6-hydroxy-1,2-dihydropyridine, 1-morpholinyl-2-keto-3-pyridinium chloride-4-methyl-6-hydroxy-1,2-dihydropyridine, 1-morpholinyl-2-keto-3-pyridinium chloride-4-methyl-6hydroxy-1,2-dihydropyridine, 1-(4'-dimethylamino)-phenyl-2-keto-3-(2''-methyl)-pyridinum chloride-4-carbethoxy-6-hydroxy-1,2-dihydropyridine, 1-dimethylamino-2-keto-3pyridinium chloride-4-phenyl-6-hydroxy-1,2-dihydropyridine, 1-(3'-dimethylamino)-n-propyl-2-keto-3-pyridinium chloride-4-methyl-6-hydroxy-1,2-dihydropyridine, 1-(3'-dibutylamino)-n-propyl-2-keto-3-pyridinium chloride-4-methyl-6-hydroxy-1,2-dihydropyridine, 1-(2'-diethylamino)-ethyl-2-keto-3-pyridinium chloride-4-methyl-6-hydroxy-1,2-dihydropyridine, 1-(2'-dihydroxyethylamino)-ethyl-2-keto-3-pyridinium chloride-4-methyl-6-hydroxy-1,2-dihydropyridine, 1-[2'-(2''-hydroxy)ethylamino]-2-keto-3-pyridinium chloride-4-methyl-6-hydroxy-1,2-dihydropyridine, 1-(2'-N-methyl-piperazinyl)-ethyl-2-keto-3-pyridinium chloride-4-methyl-6-hydroxy-1,2-dihydropridine.

The aforenamed coupling components can be employed in the other Examples.

EXAMPLE 7

21.9 Parts of 3-aminobenzoic acid-3'-dimethylamino-n-propylamide are diazotized at 0°. An ice-cold aqueous hydrochloric acid solution of 25 parts of 3-pyridinium chloride-2,6-dihydroxy-4-methylpyridine is added to the hydrochloric acid diazo solution. The pH of the reaction solution is adjusted to 2.5 by dropping in 50% aqueous sodium acetate solution. After formation of the dye it is salted out with sodium chloride and collected on a filter. The dye is a yellow water soluble powder which gives greenish yellow dyeings of good light and wet fastness on polyacrylonitrile fibres.

EXAMPLE 7a

A solution of 14.15 parts of 1-amino-3-chloro-4-methylbenzene in 200 parts of 6% hydrochloric acid is diazotized at 0° with 6.9 parts of sodium nitrite. 31 Parts of 2-keto-3-pyridinium chloride-4-carbethoxy-6-hydroxy-1,2-dihydropyridine (prepared by reacting pyridinium chloride acetamide with oxalacetic diethyl ester in methanolic sodium hydroxide solution) are dissolved in 200 parts of water and the solution added dropwise to the ice-cold diazo solution. Finally 15 parts of crystallized sodium acetate are added. The coupling solution is stirred at 0-20°, whereupon the temperature increases to 40°. Hydrochloric acid is added to adjust to a mineral acid reaction, then the dye formed is salted out with sodium chloride and collected on a filter. The resulting yellow water-soluble powder has the formula

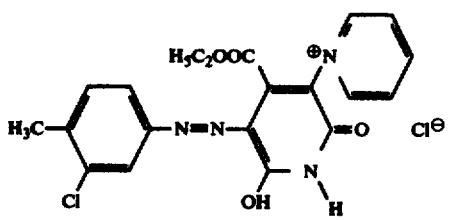

and dyes polyacrylonitrile fibres in fast yellow shades.

EXAMPLE 7b

A solution of 14.15 parts of 1-amino-3-chloro-4-methylbenzene in 200 parts of 6% hydrochloric acid is diazotized at 0° with 6.9 parts of sodium nitrite. 31 parts of 2-keto-3-pyridinium chloride-4-N,N-dimethylcarbamoyl-6-hydroxy-1,2-dihydropyridine (prepared by reacting 2-keto-3-pyridinium chloride-4-carbethoxy-6-hydroxy-1,2-dihydropyridine with dimethylamine) are dissolved in 200 parts of water and the solution added dropwise to the ice-cold diazo solution. After the addition of 15 parts of crystallized sodium acetate the coupling solution is stirred at 0–20°, then the temperature is increased to 40°. Hydrochloric acid is added to adjust to a mineral acid reaction and the dye formed salted out with sodium chloride and collected on a filter. It is a yellow water-soluble powder of the formula

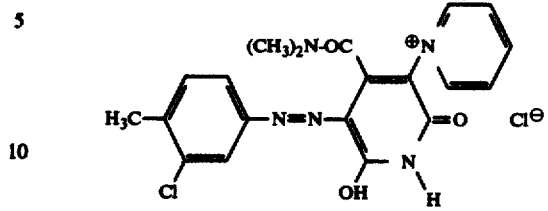

which dyes polyacrylonitrile fibres in fast yellow shades. The structural composition of further dyes is shown in the following table. They can be produced as described in the foregoing Examples and have the formula

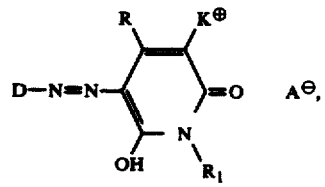

where D, R, $R_1$ and $K^\oplus$ have the meanings assigned to them in the table. The anion $A^\ominus$ may be any of those named in the disclosure.

| Ex. No. | D = Radical of the diazo compound | R | $R_1$ | $K^\oplus$ | Shade of dyeing on polyacrylonitrile fibres |
|---|---|---|---|---|---|
| 8 |  | $-CH_2-CO-NH-\square$ | H |  (2-CH_3 pyridinium) | yellow |
| 9 |  | $C_2H_5-O-CH_2-$ | " | (3-CH_3 pyridinium) | orange |
| 10 |  | $CH_3-O-CH_2-$ | $-CH_3$ | (2,6-di-CH_3 pyridinium) | " |
| 11 |  | $CH_3-$ | $-(CH_2)_3-CH_3$ | (3,4-di-CH_3 pyridinium) | yellow |
| 12 |  | " | $-CH_2-\text{cyclohexyl}$ | (3-$C_2H_5$ pyridinium) | red |
| 13 |  | cyclohexyl | H | (3-Br pyridinium) | " |
| 14 |  | $C_2H_5$ | " | (N-benzyl pyridinium) | yellow |

-continued

| Ex. No. | D = Radical of the diazo compound | R | $R_1$ | $K^{\oplus}$ | Shade of dyeing on polyacrylonitrile fibres |
|---|---|---|---|---|---|
| 15 | 4-methylphenyl | —CH₂—COOCH₃ | " | 3-cyano-N-methylpiperidinium | " |
| 16 | 2,6-dichloro-4-nitrophenyl | CH₃ | " | 3-(2-hydroxyethyl)-N-methylpiperidinium | " |
| 17 | 4-nitrophenyl | —CH₂—SO₂—CH₃ | " | 3-(N,N-dimethylcarbamoyl)-N-methylpiperidinium | " |
| 18 | 2,5-dichloro-4-methylphenyl | C₆H₅—NH—OC—CH₂— | —C₂H₄—N(CH₃)₂ | 4-tert-butoxy-N-methylpiperidinium | " |
| 19 | 2-chloro-phenyl | CN—CH₂— | (CH₃)₂N— | N-methylpiperidinium | " |
| 20 | 2,3-dichlorophenyl | (CH₃)₂N—OC—CH₂— | —C₂H₄—N(CH₃)(NH₂)·2Cl | | " |
| 21 | 4-methylphenyl | —CH₃ | | | " |

-continued

| Ex. No. | D = Radical of the diazo compound | R | $R_1$ | $K^\oplus$ | Shade of dyeing on polyacrylonitrile fibres |
|---|---|---|---|---|---|
| 22 | 4-methyl-2-chloro-1-methoxycarbonyl-phenyl (H$_3$CO-C$_6$H$_3$(Cl)-) | R | —CH$_2$CH$_2$—N(pyridinium-Cl) | " | orange |
| 23 | 2-methoxy-4-chloro-5-methyl-phenyl | " | —C$_2$H$_4$—N(morpholine) | " | " |
| 24 | 4-(4-methylphenylsulfonyl)-4-chloro-phenyl-SO$_2$- | " | —C$_2$H$_4$—N(piperazine-NH) | " | yellow |
| 25 | 2-chloro-phenylsulfonyl-phenyl | " | —N(pyrrolidine)H | " | orange |
| 26 | 3-chloro-4-methyl-phenoxy H$_3$CO$_2$S- | CH$_3$— | —N(Cl-pyrrolidine-CH$_3$)H | " | yellow |
| 27 | 2-methoxycarbonyl-phenyl (COOCH$_3$) | " | —C$_6$H$_5$ | " | " |
| 28 | 4-methyl-phenoxy-phenyl | CH$_2$-C$_6$H$_5$ / CH$_3$— | —N(pyridinium)—C$_2$H$_4$OH | " | orange |
| 29 | 2-methyl-phenoxy-phenyl | " | " | " | yellow |

| Ex. No. | D = Radical of the diazo compound | R | $R_1$ | $K^\ominus$ | Shade of dyeing on polyacrylonitrile fibres |
|---|---|---|---|---|---|
| 30 | (2-phenoxy-phenyl) | " | (S-OCH₃ / C=N-CH thiazoline-like) | " | " |
| 31 | (3-acetyl-phenyl, COCH₃) | " | (tetrahydrofuranyl with H) | " | " |
| 32 | (phenyl) | " | N(4-methylphenyl)(phenyl)-NH | (2-methoxy-piperidinyl) | " |
| 33 | (2,6-dimethyl-chlorophenyl) | " | (biphenyl) | (piperidinyl N-) | " |
| 34 | (5,6,7,8-tetrahydronaphthalenyl-SO₂-N(CH₃)₂) | H | H | (bis-dihydroquinoline joined by Cl) | red |
| 35 | (phenyl-NHCO-(4-methyl-2-methoxy)phenyl) | CH₃— | | | " |

| Ex. No. | D = Radical of the diazo compound | R | R₁ | K⊕ | Shade of dyeing on polyacrylonitrile fibres |
|---|---|---|---|---|---|
| 36 | | " | " | | orange |
| 37 | | " | " | | red |
| 38 | | " | " | | yellow |
| 39 | | " | " | | " |
| 40 | | " | " | | orange |
| 41 | | " | " | | red |
| 42 | | " | " | | yellow |

| Ex. No. | D = Radical of the diazo compound | R | $R_1$ | $K^{\oplus}$ | Shade of dyeing on polyacrylonitrile fibres |
|---|---|---|---|---|---|
| 43 | 4-methoxy-3-methylphenyl-SO₂-CH₂-phenyl | H | " | pyrimidinyl ring with CH₃ | orange |
| 44 | 4-methyl-2-(N,N-dimethylsulfamoyl)-3-chlorophenyl | CH₃— | " | 1,3-dimethylimidazolium | yellow |
| 45 | 4-methyl-N-(morpholino-like) phenyl | " | " | 1,3,4-trimethylimidazolium | orange |
| 46 | 4-methyl-N-(morpholino) phenyl | " | " | 1,3,4,5-tetramethylimidazolium | " |
| 47 | 4-butoxy-methylphenyl ($C_4H_9O$) | " | " | 1,3-dimethylbenzimidazolium | " |
| 48 | 2-methyl-5-(N-methyl-N-phenylsulfamoyl)phenyl | " | " | 1H-benzotriazolyl | yellow |

-continued

| Ex. No. | D = Radical of the diazo compound | R | $R_1$ | $K^{\oplus}$ | Shade of dyeing on polyacrylnitrile fibres |
|---|---|---|---|---|---|
| 49 | (4-methoxy-3-methylphenyl) | " | " | benzisothiazolyl | orange |
| 50 | (dibenzofuran/xanthone) | " | " | " | " |
| 51 | (H5C2OOC—HN-tolyl) | " | " | methylthiazolyl (benzo) | yellow |
| 52 | (biphenyl-methyl) | N-methylpyridinium | " | N-methyl-phenyltriazolyl | orange |
| 53 | (phenoxy-methylphenyl) | " | " | triazolyl-NH | " |
| 54 | (H3C—O2S-methylphenyl) | " | " | imidazolyl | yellow |
| 55 | (2,4,5-trichlorophenyl) | " | " | dimethyltriazolyl | " |

| Ex. No. | D = Radical of the diazo compound | R | $R_1$ | $K^{\oplus}$ | Shade of dyeing on polyacrylonitrile fibres |
|---|---|---|---|---|---|
| 56 | | " | " | | " |
| 57 | | " | " | | " |
| 58 | | —COOC$_2$H$_5$ | " | | " |
| 59 | | COOCH$_3$ | " | | red |
| 60 | | " | H | | orange |
| 61 | | " | H | | red |
| 62 | | —COOC$_2$H$_5$ | " | | yellow |
| 63 | | " | " | | " |

| Ex. No. | D = Radical of the diazo compound | R | R₁ | K⊕ | Shade of dyeing on polyacrylonitrile fibres |
|---|---|---|---|---|---|
| 64 | 3-NO₂, 4-CH₃ phenyl | " | " | N-methylpiperidinium (2-CH₃) | orange |
| 65 | 3-NO₂, 4-OCH₃ phenyl | " | " | N-methylpiperidinium (3-CH₃) | " |
| 66 | 3-NO₂, 4-OCH₃ phenyl | " | —CH₃ | N-methylpiperidinium (2,6-(CH₃)₂) | yellow |
| 67 | phenyl-SO₂-O-(3-phenyl) | " | —(CH₂)₃CH₃ | N-methylpiperidinium (4-CH₃) | " |
| 68 | thiazole derivative | " | —CH₂-cyclohexyl | N-methylpiperidinium (3-C₂H₅) | red |
| 69 | 3-NO₂, 4-CH₃, H₅C₂OOC phenyl | " | H | N-methylpiperidinium (3-Br) | " |
| 70 | 3-NO₂, 4-Cl phenyl | " | " | N,N'-dimethyl-bis-piperidinium (cyclohexyl) | yellow |
| 71 | 4-CH₃ phenyl | " | " | N-methylpiperidinium (3-CN) | " |

-continued

| Ex. No. | D = Radical of the diazo compound | R | $R_1$ | $K^{\oplus}$ | Shade of dyeing on polyacrylonitrile fibres |
|---|---|---|---|---|---|
| 72 | 3,5-dichloro-4-nitrophenyl | " | " | N-piperidinyl-CH₂CH₂OH (3-position) | " |
| 73 | 4-nitrophenyl | " | " | N-piperidinyl-CO-N(CH₃)₂ (3-position) | " |
| 74 | 2,5-dichlorophenyl | " | " | N-piperidinyl-C(CH₃)₃ (4-position) | " |
| 75 | 2-bromo-4,6-dinitrophenyl | " | " | N-piperidinyl-C₂H₄OH (2-position) | " |
| 76 | 2-chlorophenyl | " | —C₂H₄N(CH₃)₂ | N-piperidinyl | " |
| 77 | 2,6-dichlorophenyl | " | —N(CH₃)₂ | " | " |
| 78 | 4-methylphenyl | " | —C₂H₄N(CH₃)₃ $^{\oplus}$ NH₂ Cl$^{\ominus}$ | " | " |
| 79 | 3-chloro-4-methoxyphenyl | " | —CH₂—CH₂—N$^{\oplus}$(piperidinyl) Cl$^{\ominus}$ | " | orange |

-continued

| Ex. No. | D = Radical of the diazo compound | R | $R_1$ | $K^\oplus$ | Shade of dyeing on polyacrylnitrile fibres |
|---|---|---|---|---|---|
| 80 | 4-chloro-2-methyl-methoxyphenyl | " | $-C_2H_4-N\!\!<\!\!\begin{array}{c}H\\ \end{array}\!\!>\!\!O$ (morpholine) | " | " |
| 81 | 4-chloro-4'-sulfonyl-biphenyl | " | $-C_2H_4-N\!\!<\!\!\begin{array}{c}H\\ \end{array}\!\!>\!\!NH$ (piperazine) | " | yellow |
| 82 | 2-(phenylsulfonyl)phenyl | " | pyrrolidine N–H | " | orange |
| 83 | 3-chloro-4-methyl (methylsulfonyl)phenyl | " | $Cl^\ominus$, N-methyl-pyrrolidinium ($H_3C$) | " | yellow |
| 84 | 2-methoxycarbonyl-4-methylphenyl | " | phenyl | " | " |
| 85 | 4-(4-methylphenoxy)phenyl | " | $-C_2H_4OH$ on pyridine N | " | orange |
| 86, 87 | 4-(4-methylbenzoyl)phenyl | " | $\begin{array}{c}S-CCH_3\\ \|\\ C=N-CH\end{array}$ | " | yellow " |
| 88 | 3-acetyl-phenyl | " | tetrahydrofuran (O,H) | 2-methoxy-1-methylpyridinium ($OCH_3$, N–) | " |

-continued

| Ex. No. | D = Radical of the diazo compound | R | R₁ | K⊕ | Shade of dyeing on polyacrylonitrile fibres |
|---|---|---|---|---|---|
| 95 | [4-methyl-N-methyl-N-phenyl-sulfonamide phenyl] | " | " | [benzimidazole-type ring] | yellow |
| 96 | [4-methoxyphenyl-N,N-dimethylamino] | " | " | [pyrazolone ring with CH₃, OCH₃, N] | " |
| 97 | [4-methylphenyl-azo-phenyl-N,N-dimethylamino] | " | " | [thiazole ring with CH₃] | orange |
| 98 | [biphenyl-NO₂-CH₃COHN] | " | " | [pyrimidine ring with CH₃] | red |
| 99 | [methylphenyl-NO₂-CN-phenyl] | " | " | [imidazole ring with CH₃] | yellow |
| 100 | [benzyl-CH₂-SO₂-methylphenyl-OCH₃] | " | " | [pyrimidine ring with CH₃] | orange |
| 101 | [(CH₃)₂N-SO₂-Cl-methylphenyl] | " | " | [imidazole ring with CH₃] | yellow |

-continued

| Ex. No. | D = Radical of the diazo compound | R | R₁ | K⊕ | Shade of dyeing on polyacrylonitrile fibres |
|---|---|---|---|---|---|
| 102 | [4-methylphenyl-N(CH₂—CH₂—CO) lactam] | " | " | 1,3-dimethyl-imidazolium (HC=N ring with CH₃, C—CH₃) | orange |
| 103 | [4-methylphenyl-N(CH₂—CH₂—O—CO) ring] | " | " | 1,3-dimethyl-imidazolium | " |
| 104 | 4-C₄H₉O—C₆H₄— | " | " | 1,3-dimethyl-benzimidazolium | " |
| 105 | [2-methylphenyl-SO₂—N(CH₃)—phenyl] | " | " | 2-H,3-methyl-benzotriazolium | yellow |
| 106 | [2-methyl-4-methyl-phenyl with OCH₃] | " | " | 3-methyl-benzothiazolium | orange |
| 107 | xanthene (dibenzo-dioxin) | " | " | 3-methyl-thiadiazolium | " |

| Ex. No. | D = Radical of the diazo compound | R | R₁ | K⊕ | Shade of dyeing on polyacrylnitrile fibres |
|---|---|---|---|---|---|
| 108 | | | | | yellow |
| 109 | | " | " | | " |
| 110 | | " | " | | orange |
| 111 | | " | " | | yellow |
| 112 | | " | " | | " |
| 113 | | " | " | | " |
| 114 | | " | " | | " |
| 115 | | —CO—N(CH₃)₂ | " | | " |

-continued
| Ex. No. | D = Radical of the diazo compound | R | $R_1$ | $K^{\oplus}$ | Shade of dyeing on polyacrylonitrile fibres |
|---|---|---|---|---|---|
| 116 |  | —CO—$NH_2$ | " | " | " |
| 117 | 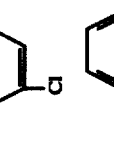 | " | —$CH_2CN$ | " | " |
| 118 | 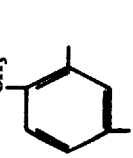 | " | —CONH—$CH_3$ | " | " |
| 119 | 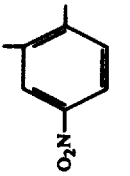 | " | —$CH_2COOC_2H_5$ | " | " |
| 120 | 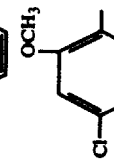 | —CO—NH—$CH_3$ | " | " | " |
| 121 |  | —CONH—$C_4H_9$ | H | " | " |
| 122 | 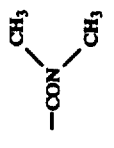 | —CON(CH_3)(CH_3) | " | " | red |

-continued

| Ex. No. | D = Radical of the diazo compound | R | $R_1$ | $K^⊕$ | Shade of dyeing on polyacrylonitrile fibres |
|---|---|---|---|---|---|
| 123 | " | " | " | (quinoline-type N-containing bicyclic) | " |
| 124 | (benzothiazole with OC₂H₅-phenyl and H₃C- substituents) | $-CO-N(C_2H_5)_2$ | " | (N-methyl piperidine ring fused) | orange |
| 125 | (dimethoxyphenyl) | " | " | (isoquinoline-type) | red |
| 126 | (tolyl-CONH-phenyl) | $-CO-NH-C_2H_4OH$ | " | (N-CH₃ piperidine) | orange |
| 127 | (tolyl-N=N-phenyl) | $-CO-N(C_2H_4OH)_2$ | " | (N-pyridinium) | red |
| 128 | (tolyl-N=N-naphthyl) | $-CO-N(C_2H_4OH)_2$ | " | " | reddish |
| 129 | (H₃COC-phenyl) | $-CO-N(C_3H_7)(H)$ | " | " | yellow |

-continued

| Ex. No. | D = Radical of the diazo compound | R | $R_1$ | $K^\oplus$ | Shade of dyeing on polyacrylonitrile fibres |
|---|---|---|---|---|---|
| 130 | 4-phenoxyphenyl | —CO—N(C$_2$H$_4$OH)(CH$_3$) | " | " | " |
| 131 | 1,2,4-triazole derivative | morpholinyl-C$_2$H$_4$—NH—CO— | " | " | " |
| 132 | 4-(H$_5$C$_2$OOC)phenyl | —CO—NH—C$_2$H$_4$—piperazinyl-NH | " | " | " |
| 133 | 3-methyl-4-(COOC$_2$H$_5$)phenyl | —CO—NH—phenyl | " | " | " |
| 134 | 3-(COOC$_2$H$_5$)phenyl | —CO—NH—(2-methylphenyl) | " | " | " |
| 135 | 2-OCH$_3$-5-CH$_3$-phenyl | —CO—N(CH$_3$)(phenyl) | " | " | orange |
| 136 | 3-chloro-phenyl-NH-SO$_2$-phenyl | —CO—NH—CH$_2$—CH(OH)—CH$_3$ | " | " | yellow |

-continued

| Ex. No. | D = Radical of the diazo compound | R | $R_1$ | K⊕ | Shade of dyeing on polyacrylnitrile fibres |
|---|---|---|---|---|---|
| 137 | (4-methylphenyl 2-sulfonatophenyl ether) | —CO—NH—CH$_2$—C$_6$H$_5$ | " | " | " |
| 138 | 4-(methylsulfonyl)phenyl | —CO—NH—C$_2$H$_4$—C$_6$H$_5$ | " | " | " |
| 139 | 2-methyl-3-nitro-5-methoxyphenyl | " | " | 4-methylpyridinium | " |
| 140 | 2-methyl-3-nitro-5-methoxyphenyl | " | " | 2-methylpyridinium | " |
| 141 | 2-methyl-3-nitro-5-ethoxyphenyl | N(CH$_2$C$_6$H$_5$)$_2$—CO— | CH$_3$ | 3-methylpyridinium | orange |
| 142 | 4-methylphenyl phenyl sulfone | " | —(CH$_2$)$_3$—CH$_3$ | 2,6-dimethylpyridinium / 3,4-dimethylpyridinium | yellow |

-continued

| Ex. No. | D = Radical of the diazo compound | R | R₁ | K⊕ | Shade of dyeing on polyacrylonitrile fibres |
|---|---|---|---|---|---|
| 143 | [thiadiazole with NO₂] | -CO-N(CH₃)₂ | -CH₂-C₆H₁₁ | pyridinium-C₂H₅ | red |
| 144 | 4-H₅C₂OOC-2-CH₃-5-NO₂-phenyl | " | H | pyridinium-Br | " |
| 145 | 2-CH₃-4-NO₂-6-Cl-phenyl | " | " | pyridinium-CH₂-C₆H₁₁ | yellow |
| 146 | 4-H₃C-phenyl | " | " | pyridinium-CN | " |
| 147 | 2,6-Cl₂-4-NO₂-phenyl | -CO-NH-C₂H₄-N(CH₃)₂ | " | pyridinium-C₂H₄OH | yellow-brown |
| 148 | 4-NO₂-phenyl | " | " | pyridinium-CON(CH₃)₂ | yellow |
| 149 | 2,5-Cl₂-4-CH₃-phenyl | -CO-NH-CH₃ | " | pyridinium-OC(CH₃)₃ | " |

-continued

| Ex. No. | D = Radical of the diazo compound | R | R₁ | K⊕ | Shade of dyeing on polyacrylonitrile fibres |
|---|---|---|---|---|---|
| 150 | 2-Br, 4-NO₂, 6-NO₂, 3-CH₃ phenyl | | —N(CH₃)(C₂H₄OH), piperidinyl | | " |
| 151 | tolyl | | —N(CH₃)(C₂H₄-), piperidinyl | | " |
| 152 | 2,3-dichlorophenyl | | —N(CH₃)₂ | | " |
| 153 | 4-methylphenyl | | —C₂H₄—N⁺(CH₃)₃ NH₂ | | " |
| 154 | 2-chloro-3-methoxy-5-methylphenyl | —CO—N(C₂H₅)₂ | —CH₂CH₂—N⁺(piperidinyl)Cl | | orange |
| 155 | 2-methyl-4-chloro-6-methoxyphenyl | | —C₂H₄—morpholinyl | | " |
| 156 | 4-(4-methylphenylsulfonyl)-4-chlorophenyl | —CO—N(pyrrolidinyl) | —C₂H₄—piperazinyl | | yellow |
| 157 | 2-methylphenylsulfonyl-phenyl | | pyrrolidinyl | | orange |

-continued

| Ex. No. | D = Radical of the diazo compound | R | R₁ | K⊕ | Shade of dyeing on polyacrylonitrile fibres |
|---|---|---|---|---|---|
| 158 | H₃CSO₂—⟨Cl⟩—⟨⟩ | | Cl—⟨N(H)(CH₃)⟩ (pyrrolidine with Cl, CH₃) | " | yellow |
| 159 | COOCH₃—⟨⟩ | —CON⟨piperidine⟩H | ⟨phenyl⟩ | " | " |
| 160 | I—⟨⟩—O—⟨⟩ | " | ⟨pyridyl⟩ | " | orange |
| 161 | ⟨⟩—O—⟨⟩ | " | —C₂H₄—OH | " | yellow |
| 162 | ⟨⟩—CO—⟨⟩ | " | S—CCH₃, C=N—CH (thiazole) | ⟨pyridinyl-OCH₃⟩ | " |
| 163 | COOCH₃—⟨⟩ | —CO—N(C₄H₉)(C₄H₉) | ⟨O-H tetrahydrofuran⟩ | " | " |
| 164 | ⟨⟩ | " | ⟨cyclohexyl⟩—NH—⟨cyclohexyl⟩ | ⟨N-methylpiperidinium⟩ | " |

-continued
| Ex. No. | D = Radical of the diazo compound | R | $R_1$ | $K^⊕$ | Shade of dyeing on polyacrylnitrile fibres |
|---|---|---|---|---|---|
| 165 | 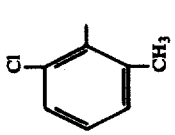 |  | 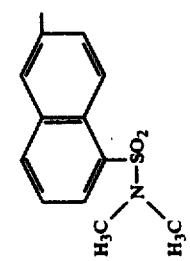 | " | " |
| 166 | 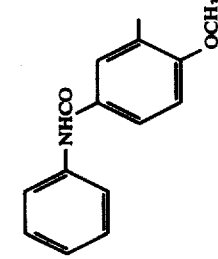 | " | H | " | " |
| 167 |  | $-CO-NH_2$ | " | 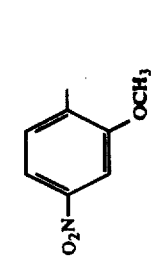 | red |
| 168 |  | " | " | 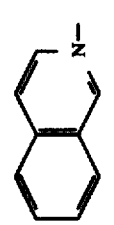 | orange |
| 169 |  | " | " | 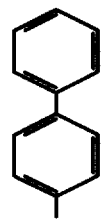 | red |

-continued

| Ex. No. | D = Radical of the diazo compound | R | $R_1$ | $K^⊕$ | Shade of dyeing on polyacrylonitrile fibres |
|---|---|---|---|---|---|
| 170 | | | | | yellow |
| 171 | | " | " | | " |
| 172 | | | " | | orange |
| 173 | | | " | | red |
| 174 | | " | " | | yellow |
| 175 | | " | " | | orange |
| 176 | | " | " | | yellow |

-continued

| Ex. No. | D = Radical of the diazo compound | R | R₁ | K⊕ | Shade of dyeing on polyacrylonitrile fibres |
|---|---|---|---|---|---|
| 177 | 4-methyl-N-(2-oxopyrrolidinyl)phenyl | —CONH—CH₂CN | " | 1,2-dimethylimidazolium | orange |
| 178 | 4-methyl-N-(2-oxopyrrolidinyl)phenyl | —CONH—CH₂COOC₂H₅ | " | 1,2-dimethylimidazolium | " |
| 179 | 4-butoxyphenyl | —CONH—NH₂ | " | 1,3-dimethylbenzimidazolium | " |
| 180 | N-methyl-N-phenyl-(tolylsulfonyl)amino | —CO—NHN(C₂H₄OH)₂ | " | 2-methylbenzimidazolium (NH) | yellow |
| 181 | 2-methoxy-5-methylphenyl | " | " | 2-methylbenzothiazolium | orange |
| 182 | dibenzo-dioxin | —CO—NH—NHC₂H₄OH | " | 3-methylthiazolium | " |

-continued

| Ex. No. | D = Radical of the diazo compound | R | $R_1$ | $K^{\oplus}$ | Shade of dyeing on polyacrylonitrile fibres |
|---|---|---|---|---|---|
| 183 | 4-(H$_5$C$_2$—OCHN)—C$_6$H$_4$— | piperazine-N—CO— (N-C$_2$H$_4$CN) | | benzisoxazolium (CH$_3$) | yellow |
| 184 | biphenyl | —CONH—CH$_2$—CH(CH$_2$)$_2$O | " | 1-phenyl-methyltriazolium | orange |
| 185 | 4-phenoxyphenyl | —CONH—(CH$_2$)$_3$—OCH$_3$ | " | methyltriazolium NH | orange |
| 186 | 4-(H$_3$CO$_2$S)—C$_6$H$_4$— | " | " | pyrazolium (CH$_3$) | yellow |
| 187 | 2,5-dichlorophenyl | " | " | methylimidazolium | " |
| 188 | 2-chloro-4-methylphenyl | " | " | thiazolium (CH$_3$, CH$_3$) | " |
| 189 | 4-(H$_3$C)$_2$N—CH$_2$OC—C$_6$H$_4$— | —CONH—(CH$_2$)$_2$—OCH$_3$ | " | tetrahydroisoquinolinium | " |
| 190 | 4-methylphenyl | —CH$_2$—C$_6$H$_{11}$ | —CH$_2$CH$_2$OH | piperidinium | " |

-continued

| Ex. No. | D = Radical of the diazo compound | R | $R_1$ | $K^\oplus$ | Shade of dyeing on polyacrylonitrile fibres |
|---|---|---|---|---|---|
| 191 | 2-Cl-C6H4 | " | —CH(CH2OH)(CH3) | " | " |
| 192 | 3-Cl-C6H4 | " | —CH2CH2CH3 | " | " |
| 193 | 3,4-Cl2-C6H3 | " | —(CH2)3—OCH3 | " | " |
| 194 | 2,5-Cl2-C6H3 | " | —CH2—CH(OH)—CH3 | " | " |
| 195 | 2,5-Cl2-C6H3 | —CH3 | —(CH2)3—OH | " | " |
| 196 | 2,5-Cl2-C6H3 | " | —CH2-cyclohexyl | " | " |
| 197 | 3,4-Cl2-C6H3 | " | —CH2CH2N(CH3)2 | " | " |

-continued
| Ex. No. | D = Radical of the diazo compound | R | $R_1$ | $K^\oplus$ | Shade of dyeing on polyacrylonitrile fibres |
|---|---|---|---|---|---|
| 198 | 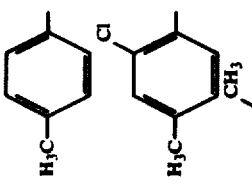 | " |  | " | " |
| 199 |  | —$C_2H_5$ | | " | " |
| 200 | 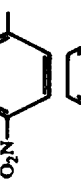 | —$CH_2CH_2CH_3$ | | " | " |
| 201 |  | —$CH_3$ |  | " | " |
| 202 |  | " | H | " | " |
| 203 | | " | " | " | " |
| 204 | 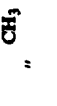 | " | —$C_2H_4OH$ | | orange |
| 205 |  | " | " | | " |

-continued
| Ex. No. | D = Radical of the diazo compound | R | $R_1$ | $K^{\oplus}$ | Shade of dyeing on polyacrylnitrile fibres |
|---|---|---|---|---|---|
| 206 | 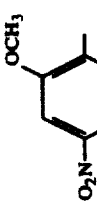 | —CH$_3$ | —C$_2$H$_4$— |  | red |
| 207 |  | " | CH$_3$—(CH$_2$)$_3$ | " | " |
| 208 |  |  | H | " | red/blue |
| 209 |  | " |  | " | orange |
| 210 | " | " | " |  | red |
| 211 |  | —CH$_2$CH$_2$CH$_3$ | —(CH$_2$)$_3$—OCH$_3$ |  | orange |

-continued

| Ex. No. | D = Radical of the diazo compound | R | R₁ | K⊕ | Shade of dyeing on polyacrylnitrile fibres |
|---|---|---|---|---|---|
| 212 | 2,4-diethoxyphenyl (OC₂H₅, OC₂H₅) | —CH₃ | —(CH₂)₄—OH | | red |
| 213 | p-tolyl-CONH-phenyl | " | " | 2-methylpyridinium | orange |
| 214 | 4-methyl-1-(phenylazo)naphthyl | " | —C₂H₄—OH | pyridinium | redblue |
| 215 | 4-methylbenzoyl-phenyl | " | H (benzyl: —CH₂—C₆H₅) | " | yellow |
| 216 | H₃COC—HN—(4-methylphenyl) | " | —C₂H₄—OH | " | orange |
| 217 | 4-chloro-phenoxy-(4-methylphenyl) | " | —CH₂—(furan-2-yl) | " | yellow |
| 218 | 1,2,4-thiadiazolyl | " | —CH(CH₂OH)CH₃ | " | red |
| 219 | 6-methoxy-benzisothiazol-3-yl | " | | " | " |

-continued

| Ex. No. | D = Radical of the diazo compound | R | $R_1$ | $K^\oplus$ | Shade of dyeing on polyacrylnitrile fibres |
|---|---|---|---|---|---|
| 220 | (dibenzofuran-dione structure) | —CH₃ | H | N-methyl pyridinium (with CH₃) | " |
| 221 | triazole (HC=N-N=CH-N) | " | " | 2,6-dimethyl-N-methyl pyridinium | yellow |
| 222 | H₃C OOC—C₆H₄— | " | " | 2-methyl-4-methyl-N-methyl pyridinium | " |
| 223 | C₆H₅—CONH—C₆H₄— | " | —CH₃ | N-methyl pyridinium | " |
| 224 | NC—C₆H₄— | " | —C₂H₄—C₆H₁₁ | " | " |
| 225 | H₅C₂OOC—C₆H₄—O—C₆H₄—COOC₂H₅ | " | —C₂H₅ | " | " |

-continued

| Ex. No. | D = Radical of the diazo compound | R | R₁ | K⊕ | Shade of dyeing on polyacrylonitrile fibres |
|---|---|---|---|---|---|
| 226 | (2-OCH₃, 5-CH₃ phenyl) | -CH₂-C₆H₅ | H | " | orange |
| 227 | H₃COCHN-cyclohexyl-phenyl | -CH₃ | -CH₂CH(OH)-CH₃ | " | red |
| 228 | (3-Cl phenyl)-NH-SO₂-phenyl | " | H | N-methyl-2-methylpiperidine | yellow |
| 229 | H₃C-SO₂-(4-methylphenyl) | " | -C₂H₄OH | 4-methyl-N-piperidine | " |
| 230 | (2-NO₂, 5-CH₃ phenyl) | " | " | 2-methyl-N-piperidine | " |
| 231 | (2-NO₂, 5-OCH₃ phenyl) | -CH₃ | -C₂H₄OH | 3-methyl-N-piperidine | orange |
| 232 | (2-NO₂, 5-OC₂H₅ phenyl) | -C₆H₅-O-CH₂- | -CH₃ | 2,6-dimethyl-N-piperidine | " |

-continued

| Ex. No. | D = Radical of the diazo compound | R | R₁ | K⊕ | Shade of dyeing on polyacrylonitrile fibres |
|---|---|---|---|---|---|
| 233 | 3-sulfophenyl-phenyl sulfonate | | —(CH₂)₃—CH₃ | 3,4-dimethyl-N-methylpyridinium | yellow |
| 234 | nitro-thiazole carbonyl | " | —CH₂—cyclohexyl | 3-ethyl-N-methylpyridinium | red |
| 235 | 4-nitro-2-(methoxycarbonyl)phenyl | —CH₃— | —C₂H₄-morpholino | 3-bromo-N-methylpyridinium | " |
| 236 | 2-nitro-4-chloro-6-methylphenyl | " | H | 2-benzyl-N-methylpyridinium | " |
| 237 | 4-methylphenyl | " | " | 3-cyano-N-methylpyridinium | yellow |
| 238 | 2,6-dichloro-4-nitrophenyl | —CH₃ | " | 3-(C₂H₄OH)-N-methylpyridinium | " |
| 239 | 4-nitrophenyl | " | " | 3-(CON(CH₃)₂)-N-methylpyridinium | " |

-continued
| Ex. No. | D = Radical of the diazo compound | R | $R_1$ | $K^{\oplus}$ | Shade of dyeing on polyacrylonitrile fibres |
|---|---|---|---|---|---|
| 240 |  | | 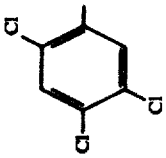 |  | " |
| 241 |  | " | " | " | " |
| 242 |  | 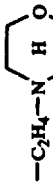 |  |  | " |
| 243 |  | " | $-N(CH_3)_2$ | " | " |
| 244 |  | " |  | " | " |
| 245 |  |  |  | " | orange |
| 246 | 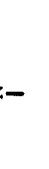 | " |  | " | " |

-continued

| Ex. No. | D = Radical of the diazo compound | R | R₁ | K⊕ | Shade of dyeing on polyacrylonitrile fibres |
|---|---|---|---|---|---|
| 247 | 4-Cl-C₆H₄-SO₂-C₆H₄- | " | -C₂H₄-N(piperazine-NH) | " | yellow |
| 248 | 2-methylphenyl-SO₂-C₆H₅ | " | pyrrolidine-NH | " | orange |
| 249 | 3-Cl-4-CH₃-C₆H₃-SO₂-CH₃ (H₃C–O₂S) | -CH₃ | N-methylpyrrolidinium Cl⊖ | " | yellow |
| 250 | 2-COOCH₃-methylphenyl | " | C₆H₅- | " | " |
| 251 | 4-methylphenoxy-phenyl | " | 2-methylpyridine-C₂H₄OH | " | orange |
| 252 | 2,4-dimethylphenoxy-phenyl | " | thiazoline (S-CCH₃, N-CH) | " | yellow |
| 253 | 2-methylphenyl-CO-C₆H₅ | " | tetrahydrofuran (O, H) | " | " |
| 254 | 3-OCH₃-phenyl-CH₃ | " | | N-methyl-2-methoxypyridinium | " |

-continued

| Ex. No. | D = Radical of the diazo compound | R | R₁ | K⊕ | Shade of dyeing on polyacrylonitrile fibres |
|---|---|---|---|---|---|
| 255 | phenyl | " | diphenylamine / biphenyl | piperidinyl | " |
| 256 | 3-chloro-2-methylphenyl | " | | " | " |
| 257 | naphthyl-SO₂-N(CH₃)₂ | " | H | quinoline | red |
| 258 | 3-methyl-4-methoxyphenyl-NHCO-phenyl | " | " | 2-chloro-quinoline | " |
| 259 | 2-methyl-3-methoxy-4-nitrophenyl | " | " | 6-methyl-quinoline | orange |
| 260 | thiadiazole | " | —(CH₂)₃—OCH₃ | isoquinoline | red |

-continued

| Ex. No. | D = Radical of the diazo compound | R | R₁ | K⊕ | Shade of dyeing on polyacrylonitrile fibres |
|---|---|---|---|---|---|
| 261 | [4-methylphenyl-N(CH₃)-SO₂-phenyl] | " | —C₂H₄OH | [benzo-fused ring with CH=CH-N and N=CH] | yellow |
| 262 | [3-methoxyphenyl] | " | H | [5-ring: H₂C-C(CH₃)=N-N(CH₃)-C(=O)] | " |
| 263 | [(CH₃)₂N-phenyl-N=N-phenyl] | " | —C₂H₄OH | [5-ring with CH₃-C=N, HC=, S, N-CH] | orange |
| 264 | [4-methylphenyl-phenyl-NHCOCH₃] | CH₃CH₂— | —CH₂CH(OH)—CH₃ | [6-ring: N=CH-CH=CH-N-CH with H₃C] | red |
| 265 | [NO₂, CN substituted phenyl with CH₃] | " | H | [5-ring: H₃C-N-N=CH-HC=N-CH] | " |
| 266 | [OCH₃, CH₃ substituted phenyl-SO₂-CH₂-phenyl] | " | " | [6-ring: CH=N-CH=N-C(CH₃)=CH] | orange |
| 267 | [Cl, (CH₃)₂N-SO₂ substituted phenyl] | " | " | [5-ring: CH₃-N-CH=N-HC=HC-N] | yellow |

| Ex. No. | D = Radical of the diazo compound | R | $R_1$ | $K^{\oplus}$ | Shade of dyeing on polyacrylonitrile fibres |
|---|---|---|---|---|---|
| 268 | *(4-methylphenyl with N(CH₂CH₂CO)₂ succinimide-like group)* | " | " | *(2,3-dimethyl-imidazolinium ring)* | orange |
| 269 | *(4-methylphenyl with N(CH₂CH₂)(CO-O-CO) group)* | " | " | *(2,3-dimethyl-imidazolinium ring)* | " |
| 270 | *(4-butoxyphenyl)* | —CH₃ | —C₂H₄OH | *(1,3-dimethyl-benzimidazolium)* | " |
| 271 | *(N-phenyl-N-(2-methylphenyl)sulfonyl-methylamino)* | " | " | *(1-methyl-benzotriazolium, NH)* | yellow |
| 272 | *(2-methoxy-5-methylphenyl)* | " | " | *(3-methyl-benzothiazolium)* | orange |
| 273 | *(dibenzo-p-dioxin-2-yl)* | " | " | *(3-methyl-thiadiazolium)* | " |

| Ex. No. | D = Radical of the diazo compound | R | $R_1$ | K⊕ | Shade of dyeing on polyacrylonitrile fibres |
|---|---|---|---|---|---|
| 274 | | | | | yellow |
| 275 | | | $-CH(CH_2OH)CH_3$ | | orange |
| 276 | | " | " | | " |
| 277 | | " | " | | yellow |
| 278 | | " | " | | " |
| 279 | | " | " | | " |
| 280 | $-CH_2O-C_6H_5$ | | $-C_2H_4-OH$ | | " |
| 281 | $-CH_3$ | | H | | orange-red |

| Ex. No. | D = Radical of the diazo compound | R | R₁ | K⊕ | Shade of dyeing on polyacrylonitrile fibres |
|---|---|---|---|---|---|
| 282 | H₃CO-C₆H₄-N=N-C₆H₃(OCH₃)(CH₃)- | " | " | piperidinium | blue-red |
| 283 | Cl-C₆H₄-N=N-C₆H₃(OC₂H₅)(NHCOCH₃)- | —C₂H₅ | —(CH₂)₃—OCH₃ | " | red-orange |
| 284 | O₂N-C₆H₄-N=N-C₆H₃(CH₃)(CH₃)- | " | " | " | red |
| 285 | H₅C₂O-C₆H₄-N=N-C₆H₃(OCH₃)(CH₃)- | CH₃—O—CH₂— | —(CH₂)₃—OH | " | orange |
| 286 | O₂N-C₆H₃(Cl)-N=N-C₆H₃(CH₃)- | —CH₃ | —(CH₂)N(CH₃)₂ | " | red |
| 287 | H₃C-C₆H₄-N=N-C₆H₃(OCH₃)(CH₃)- | " | H | " | red |

-continued
| Ex. No. | D = Radical of the diazo compound | R | $R_1$ | $K^\oplus$ | Shade of dyeing on polyacrylonitrile fibres |
|---|---|---|---|---|---|
| 288 | 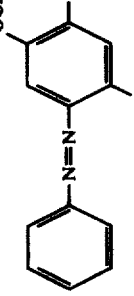 | " | —$C_2H_4OH$ | 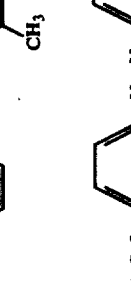 | " |
| 289 | 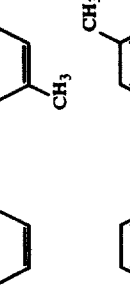 | " | —$(CH_2)_3$—N($C_2H_4OH$)$_2$ |  | orange |
| 290 | 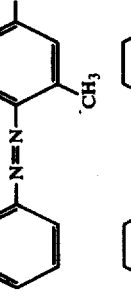 | —$C_2H_5$ | H | 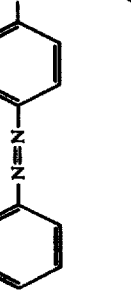 | orange-red |
| 291 |  | —$CH_3$ | —$(CH_2)_3$—$OCH_3$ | 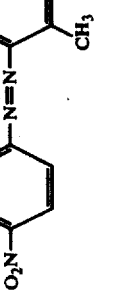 | bluered |
| 292 |  | $CH_3OCH_2$— | " | " | red-orange |
| 293 | 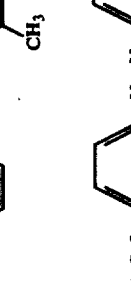 | $C_2H_5OCH_2$— | —$(CH_2)_3$—OH | " | red |

-continued
| Ex. No. | D = Radical of the diazo compound | R | $R_1$ | $K^\oplus$ | Shade of dyeing on polyacrylonitrile fibres |
|---|---|---|---|---|---|
| 294 |  | $-C_2H_5$ | $-(CH_2)_3N\begin{matrix}CH_3\\CH_3\end{matrix}$ | | orange |
| 295 |  | $-C_2H_5$ | $-C_2H_4OH$ | " | red |
| 296 | 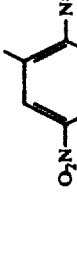 | $-CH_3$ | $-(CH_2)_3-N\begin{matrix}C_2H_4OH\\C_2H_4OH\end{matrix}$ | " | orange |
| 297 |  |  | $-CH_2CH_2-OH$ |  | yellow |
| 298 |  | " | $-CH\begin{matrix}CH_2OH\\CH_3\end{matrix}$ | " | " |
| 299 |  | " | $-CH_2CH_2CH_3$ | " | " |
| 300 |  | " | $-(CH_2)_3-OCH_3$ | " | " |

-continued

| Ex. No. | D = Radical of the diazo compound | R | R₁ | K⊕ | Shade of dyeing on polyacrylnitrile fibres |
|---|---|---|---|---|---|
| 301 | 2,5-dichlorophenyl | " | —CH₂CHCH₃ <br>               \|<br>              OH | " | " |
| 302 | 2,5-dichloro-4-methylphenyl | " | —(CH₂)₃—OH | " | " |
| 303 | 4-chloro-2-methylphenyl | —CH₃ | —CH₂—C₆H₅ | 2,6-dimethyl-dihydropyridine (N-H) | " |
| 304 | 2,5-dichloro-4-methylphenyl | " | —CH₂CH₂N(CH₃)₂ | " | " |
| 305 | 4-methyl-3-chlorophenyl | " | —(CH₂)₃N(C₂H₅)₂ | " | " |
| 306 | 4-chloro-2,5-dimethylphenyl | —C₂H₅ | —CH₂—(2-tetrahydrofuryl) | " | " |
| 307 | 2-methyl-4-(4-methylphenyl)phenyl | —CH₂CH₂CH₃ | " | " | " |

-continued
| Ex. No. | D = Radical of the diazo compound | R | R₁ | K⊕ | Shade of dyeing on polyacrylnitrile fibres |
|---|---|---|---|---|---|
| 308 | 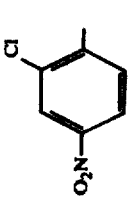 | —CH₃ | —C₂H₄—N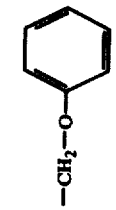NH | 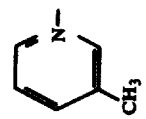 | " |
| 309 | 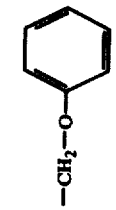 | —CH₂—O—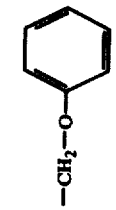 | H | 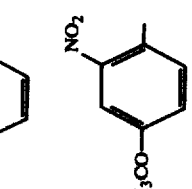 | " |
| 310 | 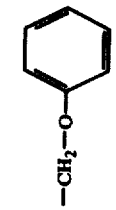 | " | " | " | " |
| 311 | 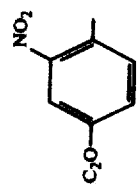 | " | —C₂H₄OH | " | orange |
| 312 | 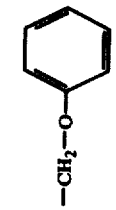 | " | " | 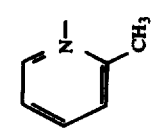 | " |
| 313 |  | —CH₃ | —C₂H₄— |  | red |

-continued

| Ex. No. | D = Radical of the diazo compound | R | $R_1$ | $K^\oplus$ | Shade of dyeing on polyacrylonitrile fibres |
|---|---|---|---|---|---|
| 314 | 2-Cl-4,5-di-OCH₃-phenyl | " | $CH_3-(CH_2)_3-$ | " | " |
| 315 | 2-CONH-phenyl-4-CH₃-3,6-di-OCH₃-phenyl | tetrahydrofuran-2-yl | H | " | redblue |
| 316 | 4-OC₂H₅-phenyl | " | cyclohexyl | " | orange |
| 317 | " | " | " | 4-methyl-1,2,3,4-tetrahydroquinolin-1-yl | red |
| 318 | 2-(4-methylphenyl)-6-methyl-benzothiazol-2-yl | $-CH_2CH_2CH_3$ | $-(CH_2)_3-O-CH_3$ | 2-methyl-tetrahydroquinolin-1-yl | orange |
| 319 | 2-CH₃-4-OC₂H₅-5-OC₂H₅-phenyl | $-CH_3$ | $-(CH_2)_3-OH$ | isoquinolin-2-yl | red |

-continued

| Ex. No. | D = Radical of the diazo compound | R | R₁ | K⊕ | Shade of dyeing on polyacrylonitrile fibres |
|---|---|---|---|---|---|
| 320 | 4-C₆H₅-NHCO-C₆H₄- | " | " | 2,6-dimethyl-piperidinyl | orange |
| 321 | 4-C₆H₅-N=N-C₆H₄- | " | " | 2,6-dimethyl-piperidinyl | red |
| 322 | 4-CH₃O-C₆H₄- | -C₆H₅ | -CH₂-cyclohexyl | " | yellow |
| 323 | 4-CH₃O-CO-NH-C₆H₄- | " | H | " | orange |
| 324 | 4-Cl-C₆H₄-O-C₆H₄- | " | -C₂H₄-OH | " | yellow |
| 325 | 1,3,4-thiadiazolyl | " | -CH₂-(tetrahydrofuryl) | " | red |
| 326 | 2-methyl-6-methoxy-benzothiazolyl | " | -CH(CH₂OH)(CH₃) | " | " |
| 327 | 1,2,3-triazolyl | -CH₃ | H | 2,6-dimethyl-4-methyl-piperidinyl | yellow |

-continued

| Ex. No. | D = Radical of the diazo compound | R | $R_1$ | $K^\oplus$ | Shade of dyeing on polyacrylonitrile fibres |
|---|---|---|---|---|---|
| 328 | $H_5C_2OOC$—C6H4— | " | " | 4-methyl-N-pyridinium | " |
| 329 | 3-(benzamido)phenyl (COHN-C6H5) | " | —$CH_3$ | 2-methyl-N-pyridinium (with $CH_3$) | " |
| 330 | 4-($COOC_2H_5$)-3-($COOC_2H_5$)-phenyl | " | —$C_2H_5$ | " | " |
| 331 | 2-$OCH_3$-5-$CH_3$-phenyl | —$CH_2$—C6H5 | H | | orange |
| 332 | 4-($H_3COCHN$)-biphenyl | —$CH_3$ | —$CH_2$—CH(OH)—$CH_3$ | | red |
| 333 | 2-$CH_3$-5-$NO_2$-phenyl | " | —$C_2H_4OH$ | 2,6-dimethyl-N-pyridinium | yellow |
| 334 | 3-$NO_2$-5-$OC_2H_5$-phenyl | —O—$CH_2$—C6H5 | —$CH_3$ | 2-methyl-N-pyridinium | orange |

-continued

| Ex. No. | D = Radical of the diazo compound | R | R₁ | K⊕ | Shade of dyeing on polyacrylnitrile fibres |
|---|---|---|---|---|---|
| 335 | 3-(phenylsulfonyl)phenyl | " | —(CH₂)₃—CH₃ | 3-ethyl-pyridinium | yellow |
| 336 | 2-nitro-4-methyl-thiazol-5-yl | —CH₃ | —CH₃ | 3-bromo-pyridinium | red |
| 337 | 3-nitro-4-(methoxycarbonyl)phenyl | —C₂H₅ | —C₂H₄—N(morpholino) | 2-benzyl-pyridinium | " |
| 338 | 2-nitro-4-chlorophenyl | —CH₂—C₆H₅ | H | 3-cyano-pyridinium | yellow |
| 339 | 4-methylphenyl | " | " | 3-(2-hydroxyethyl)-pyridinium | " |
| 340 | 2,6-dichloro-4-nitrophenyl | " | " | 3-(N,N-dimethylcarbamoyl)-pyridinium | " |
| 341 | 4-nitrophenyl | " | " | " | " |

-continued

| Ex. No. | D = Radical of the diazo compound | R | $R_1$ | $K^\oplus$ | Shade of dyeing on polyacrylonitrile fibres |
|---|---|---|---|---|---|
| 342 | 4-methyl-2,5-dichlorophenyl | $-C_2H_5$ | $-C_2H_4-N(C_2H_5)_2$ | 4-C(CH$_3$)$_3$-piperidinyl | " |
| 343 | 5-bromo-2,4-dinitrophenyl | " | " | N-(C$_2$H$_4$OH)-piperidinyl | " |
| 344 | 2-chlorotoluene | phenyl | $-C_2H_4-N(CH_3)_2$ | 2-CH$_3$-piperidinyl | " |
| 345 | 3,4-dichlorotoluene | " | $-N(CH_3)_2$ | " | " |
| 346 | 4-methylphenyl | " | $-C_2H_4-N^\oplus(CH_3)_2 NH_2$  Cl$^\ominus$ | " | " |
| 347 | 2-chloro-5-methoxytoluene | benzyl | $-CH_2CH_2-N^\oplus$(piperidinyl) Cl$^\ominus$ | " | orange |
| 348 | 4-chloro-2-methoxyphenol (2-methyl) | " | $-C_2H_4-NH$(morpholinyl) | " | " |

-continued

| Ex. No. | D = Radical of the diazo compound | R | R₁ | K⊕ | Shade of dyeing on polyacrylonitrile fibres |
|---|---|---|---|---|---|
| 349 | 4-chlorophenyl-SO₂-phenyl- | " | —C₂H₄—N(piperazine)N H NH | " | yellow |
| 350 | phenyl-SO₂-(2-chlorophenyl)- | " | pyrrolidine N-H | " | orange |
| 351 | H₃C—O₂S-phenyl-(methylphenyl)- | " | Cl⊖ N⊕H / H₃C (N-methylpyrrolidinium) | " | yellow |
| 352 | methylphenyl-COOCH₃ | —CH₃ | cyclohexyl | " | " |
| 353 | phenyl-O-phenyl- | " | piperidine N—C₂H₄OH | " | " |
| 354 355 | phenyl-CO-phenyl- | CH₃—OCH₂— | S=CCH₂ / CH / N—C (thiazoline) | " | orange |
| 356 | methylphenyl-COCH₃ | " | tetrahydrofuran H | 2-methoxy-pyridine N—OCH₃ | yellow |
| 357 | phenyl- | " | diphenylamine NH | N-methylpiperidine | " |

-continued

| Ex. No. | D = Radical of the diazo compound | R | R₁ | K⊕ | Shade of dyeing on polyacrylonitrile fibres |
|---|---|---|---|---|---|
| 358 | 3-chloro-2-methylphenyl | —CH₃ | biphenyl-4-yl | 2-methylpyridinium | " |
| 359 | 5-(dimethylsulfamoyl)naphthalen-1-yl | " | —CH₃ | 1-methylquinolinium | red |
| 360 | 4-methoxy-3-methyl-N-(phenylcarbamoyl)phenyl | " | " | 2-chloro-1-methylquinolinium | " |
| 361 | 2-methoxy-3-methyl-5-nitrophenyl | " | " | 1,6-dimethylquinolinium | orange |
| 362 | 1,3,4-thiadiazol-2-yl | —C₂H₅ | —(CH₂)₃—OCH₃ | isoquinolinium | red |

-continued

| Ex. No. | D = Radical of the diazo compound | R | $R_1$ | K⊕ | Shade of dyeing on polyacrylonitrile fibres |
|---|---|---|---|---|---|
| 363 | [4-methylphenyl-N(CH₃)-SO₂-phenyl] | " | —C₂H₄OH | [benzo-fused ring with N=CH-CH=C(CH₃)-N(CH₃)-CO-CH₂ structure] | yellow |
| 364 | [3-methoxyphenyl] | " | H | " | " |
| 365 | [4-(H₃C)₂N-phenyl-N=N-phenyl] | " | —C₂H₄OH | [thiazole ring: CH₃-C=N-N=CH-S] | orange |
| 366 | [CH₃CONH-phenyl-phenyl-CH₃] | " | —CH₂—CH—CH₃, OH | [H₃C-C=N-N=CH-CH=N] | red |
| 367 | [NO₂, CH₃, CN-substituted phenyl] | CH₃CH₂CH₂— | H | [H₃C-N—N=CH, HC=N ring] | yellow |
| 368 | [OCH₃, CH₃, CH₂SO₂-phenyl] | " | " | [CH=N-CH=C(CH₃)-CH=N ring] | orange |
| 369 | [Cl, CH₃, (CH₃)₂N-SO₂-phenyl] | " | " | [CH₃-N-N=CH, HC=N-triazole] | yellow |

-continued

| Ex. No. | D = Radical of the diazo compound | R | R₁ | K⊕ | Shade of dyeing on polyacrylonitrile fibres |
|---|---|---|---|---|---|
| 370 | (p-tolyl with H₂C—CH₂ / H₂C—CO fused ring on N) | | | 1-methyl-2-methyl imidazole ring (HC=N, N—CH₃, C—CH₃) | orange |
| 371 | (p-tolyl with H₂C—CH₂ / O—OC fused ring on N) | " | " | 1,3-dimethyl-2-methyl imidazolium (HC—N(CH₃), N(CH₃), C—CH₃) | " |
| 372 | 4-(C₄H₉O)-phenyl | —C₂H₅ | —C₂H₄OH | 1,3-dimethylbenzimidazolium | " |
| 373 | 2-CH₃-phenyl-SO₂-N(CH₃)-phenyl | " | " | 1H-benzimidazolium (N—H, N) | yellow |
| 374 | 2-OCH₃-5-CH₃-phenyl | " | " | 3-methylbenzothiazolium (S, N—CH₃) | orange |
| 375 | xanthone (dibenzo with two CO) | " | " | 3-methylthiadiazolium (S, HC, HC, N—CH₃) | " |

-continued

| Ex. No. | D = Radical of the diazo compound | R | R₁ | K⊕ | Shade of dyeing on polyacrylonitrile fibres |
|---|---|---|---|---|---|
| 376 | H₅C₂O—OC—NH—⟨phenyl-CH₃⟩ | " | " | (benzothiazole with C—CH₃, N-CH₃) | yellow |
| 377 | biphenyl | " | —CH(CH₂OH)(CH₃) | (triazole ring with N—CH₃) | orange |
| 378 | diphenyl ether | " | " | (triazole ring) | " |
| 379 | H₃C—SO₂—phenyl | " | " | (triazole ring with NH) | yellow |
| 380 | dichlorophenoxy-methylphenyl | " | " | (triazole with CH₃, N-CH₃) | " |
| 381 | chlorophenyl | —CH₂—⟨phenyl⟩ | " | (thiazole with CH₃, CH₃, N—CH₃) | " |
| 382 | H₃C—N(CH₃)—phenyl—N—CH₂OC—⟨phenyl-CH₃⟩ | —CH₃ | —C₂H₄OH | (benzimidazole with CH₃, N—CH₃) | " |
| 383 | dichlorotoluene | " | —CH(CH₃)(CH₂OH) | (N-methylpiperidine) | " |

What is claimed is:

1. A compound of the formula

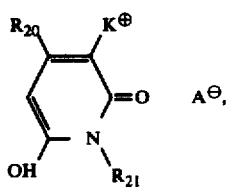

wherein

K⊕ is pyridinium, quinolinum, isoquinolinium, quinoxalinium, thiazolium, pyrimidinium, imidazolium, pyrazinium, benzoimidazolium, benzotriazolium, benzothiazolium, triazolium, tetrazolium, thiadiazolium, isoindazolium or 3-oxopyrazolinium, or a substituted derivative thereof wherein each substituent of each substituted derivative is independently lower alkyl, lower alkoxy, chloro, bromo, cyano, lower hydroxyalkyl, benzyl, phenyl or dilower alkylcarbamoyl, $R_{20}$ is hydrogen, lower alkyl, lower alkyl monosubstituted by lower alkoxy, lower alkoxycarbonyl, lower alkylsulfonyl, cyano, phenoxy, phenyl, dilower alkylcarbamoyl, phenylcarbamoyl or pyrrolidinocarbonyl, phenyl, furyl, pyridyl, lower alkoxycarbonyl or

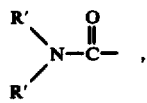

wherein each of $R_{14}$ and $R_{15}$ is independently hydrogen, alkyl of 1 to 6 carbon atoms, lower alkyl monosubstituted by hydroxy, phenyl, lower alkoxycarbonyl, lower alkoxy, cyano, morpholino, piperazino, tetrahydrofuryl or dilower alkylamino, phenyl, tolyl or lower alkoxy, or $R_{14}$ and $R_{15}$ taken together and with the nitrogen atom to which they are joined are pyrrolidino, N'-lower hydroxyalkylpiperazino, hydrazino, N'-lower hydroxyalkylhydrazino or N',N'-dilower hydroxyalkylhydrazino, 2. A compound according to claim 1 wherein K ⊕ is pyridinium, substituted pyridinium, quinolinium, substituted quinolinium, isoquinolinium or substituted isoquinolinium.

3. A compound according to claim 2 wherein each substituted derivative has 1 to 3 substituents and each substituent is independently lower alkyl, methoxy, 2-hydroxyethyl, chloro, bromo, cyano, benzyl or dimethylcarbamoyl.

4. A compound according to claim 3 wherein $R_{20}$ is hydrogen, lower alkyl, phenyl, benzyl, lower alkoxymethyl, phenoxymethyl, lower alkoxycarbonyl or

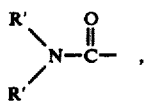

wherein each

R' is independently hydrogen, alkyl of 1 to 6 carbon atoms, lower hydroxyalkyl, phenyl, o-tolyl or phenyl lower alkyl, and $R_{21}$ is hydrogen, lower alkyl, lower hydroxyalkyl, methoxy lower alkyl, phenyl or phenyl lower alkyl.

5. A compound according to claim 4 wherein

K ⊕ is pyridinium or substituted pyridinium having 1 or 2 substituents wherein each substituent is independently lower alkyl, methoxy, 2-hydroxyethyl, bromo, cyano or N,N-dimethylcarbamoyl, $R_{20}$ is hydrogen, lower alkyl, phenyl, benzyl, lower alkoxycarbonyl or

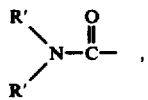

wherein each R' is independently hydrogen, lower alkyl, lower hydroxyalkyl, phenyl or benzyl, and $R_{21}$ is hydrogen, lower alkyl, benzyl, lower hydroxyalkyl or methoxy lower alkyl.

6. A compound according to claim 5 wherein

K ⊕ is pyridinium or substituted pyridinium having 1 or 2 substituents wherein each substituent is independently methyl or ethyl, $R_{20}$ is hydrogen, lower alkyl or phenyl, and $R_{21}$ is hydrogen, lower alkyl, lower hydroxyalkyl, benzyl or 3-methoxypropyl.

7. A compound according to claim 6 wherein K is pyridinium, methylpyridinium or dimethylpyridinium, $R_{20}$ is methyl or phenyl, and $R_{21}$ is hydrogen, methyl, 1-hydroxypropyl-2, benzyl, 2-hydroxyethyl or 3-methyoxypropyl.

8. A compound according to claim 7 wherein A is chloride.

9. A compound according to claim 1 wherein K is pyridinium, quinolinium, isoquinolinium, or pyridinium monosubstituted by methyl, ethyl, chloro, cyano or methoxy, $R_{20}$ is methyl, phenyl, ethoxycarbonyl or dimethylcarbamoyl, and $R_{21}$ is hydrogen, alkyl of 1 to 8 carbon atoms, lower alkyl monosubstituted by lower alkoxy, hydroxy, dilower alkylamino, lower hydroxyalkylamino, dilower hydroxyalkylamino, morpholino or N'-lower alkylpiperazino, phenyl, chlorophenyl, lower alkylphenyl, dilower alkylaminophenyl, amino, dilower alkylamino, lower hydroxyalkylamino, pyrrolidino, morpholino or N'-lower alkylpiperazino, 10. A compound according to claim 10 wherein $R_{21}$ is hydrogen, alkyl of 1 to 8 carbon atoms, 3-methoxypropyl, 2-hydroxyethyl, 2-diethylaminoethyl, 3-dimethylaminopropyl, 3-dibutylaminopropyl, 2-(2-hydroxyethylamino)ethyl, N,N-di-2-(2-hydroxyethyl)aminoethyl, 2-morpholinoethyl, 2-(N'-methylpiperazino)ethyl, phenyl, chlorophenyl, tolyl, dimethylaminophenyl, amino, dimethylamino, 2-hydroxyethylamino, pyrrolidino, morpholino or N'-methylpiperazino.

11. A compound according to claim 10 wherein

K ⊕ is pyridinium or pyridinium monosubstituted by methyl, ethyl, chloro, cyano or methoxy.

12. A compound according to claim 11 wherein

A ⊖ is chloro.

13. The compound according to claim 12 having the formula

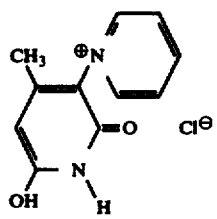

14. The compound according to claim 13 having the formula

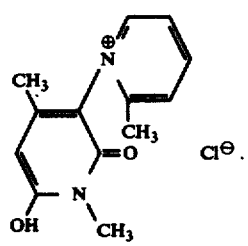

15. The compound according to claim 12 having the formula

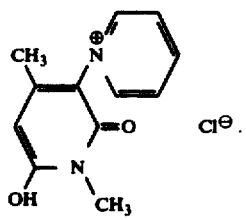

16. The comound according to claim 12 having the formula

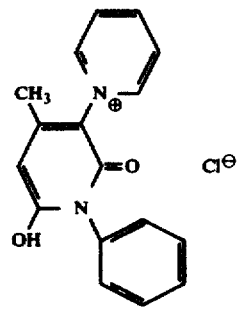

17. The compound according to claim 12 having the formula

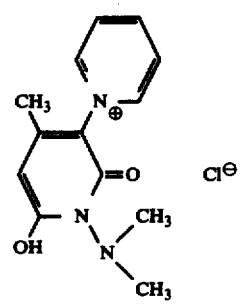

18. The compound according to claim 12 having the formula

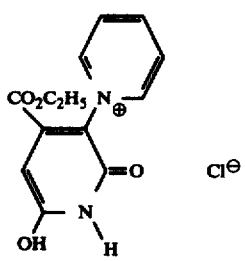

19. The compound according to claim 12 having the formula

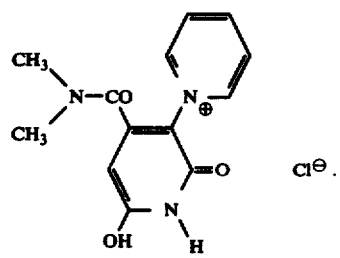

20. The compound according to claim 12 having the formula

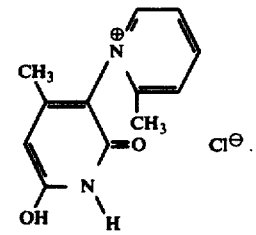

21. The compound according to claim 12 having the formula

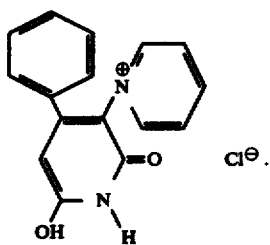

22. The compound according to claim 12 having the formula

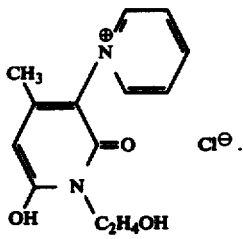

23. The compound according to claim 12 having the formula

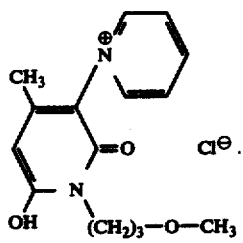

24. The compound according to claim 8 having the formula

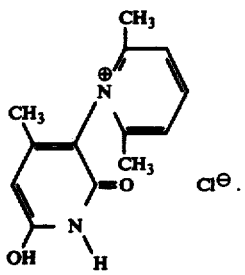

25. A compound according to claim 2 wherein $K^\oplus$ is pyridinium or substituted pyridinium.

26. A compound according to claim 25 wherein
$K^\oplus$ is pyridinium or substituted pyridinium having 1 to 3 substituents each of which is independently lower alkyl, methoxy, 2-hydroxyethyl, chloro, bromo, cyano, benzyl or dimethylcarbamoyl,
$R_{20}$ is hydrogen, lower alkyl, phenyl, benzyl, lower alkoxymethyl, phenoxymethyl, lower alkoxycarbonyl or

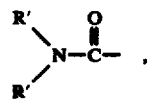

wherein each
R' is independently hydrogen, alkyl of 1 to 6 carbon atoms, lower hydroxyalkyl, phenyl, o-tolyl or phenyl lower alkyl, and
$R_{21}$ is hydrogen, lower alkyl, lower hydroxyalkyl, methoxy lower alkyl, phenyl or phenyl lower alkyl.

27. A compound according to claim 9 wherein
$K^\oplus$ is pyridinium or pyridinium monosubstituted by methyl, ethyl, chloro, cyano or methoxy.

* * * * *

UNITED STATES PATENT AND TRADEMARK OFFICE
CERTIFICATE OF CORRECTION

PATENT NO. : 4,136,033

DATED : January 23, 1979

INVENTOR(S) : Willy Steinemann

It is certified that error appears in the above-identified patent and that said Letters Patent are hereby corrected as shown below:

Column 2, lines 34 and 61, column 3, line 8 and column 4, line 14, that part of the structural formula reading "N⊕Z" should read -- ⊕N⌒Z --. Column 8, lines 24, 34 and 48, the structural formula should read -- ⊕N⌒Z --. Column 14, line 50, "382'" should read -- 3-(2' --. Column 14, line 60, "2"6" should read -- 2" --. Column 16, line 21, "6hydroxy" should read -- 6-hydroxy --. Column 16, line 23, after "(2"-methyl)-pyridinium chloride-4-" insert -- methyl-6-hydroxy-1,2-dihydropyridine, 1-amino-2-keto-3-pyridinium chloride-4- --. Column 16, line 36, after "1,2-dihydropyridine," insert -- 1-(2'-morpholinyl)-ethyl-2-keto-3-pyridinium chloride-4-methyl-6-hydroxy-1,2-dihydropyridine, --.
Column 22, Example 21, $R_1$ column, that part of the structural formula reading "Cl—N—Cl" should read -- Cl—N(CH$_3$)— --. Column 30, Example 46, $K^\oplus$ column, that part of the structural formula reading " -N(/\)C-CH$_3$ " should read -- -N(/\)=C-CH$_3$ --. Column 51, Example 123, D column, " " should read -- H$_5$C$_2$O-⌬- --. Column 69, Example 183, $K^\oplus$ column, that part of the structural formula reading " /C\\C/CH$_3$ " should read -- /S\\C/CH$_3$ --. Column 69, Example 184, R column, that part of the structural formula reading "CH" should read -- OH --. Column 92, Example 265, $K^\oplus$ column, the

UNITED STATES PATENT AND TRADEMARK OFFICE
CERTIFICATE OF CORRECTION

PATENT NO. : 4,136,033
DATED : January 23, 1979
INVENTOR(S) : Willy Steinemann

It is certified that error appears in the above-identified patent and that said Letters Patent are hereby corrected as shown below:

structural formula should read -- 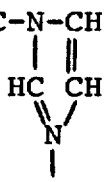 --. Column 92, Example 266, K$^{\oplus}$ column, that portion of the structural formula reading " 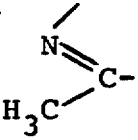 " should read -- 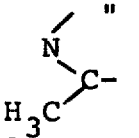 --. Column 93, Example 270, K$^{\oplus}$ column, that portion of the structural formula reading " 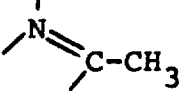 " should read -- 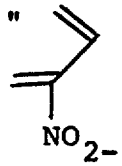 --. Column 114, Example 339, D column, that portion of the structural formula reading "H$_2$C" should read -- H$_3$C- --. Column 115, Example 343, D column, that portion of the structural formula reading " 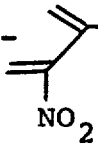 " should read -- 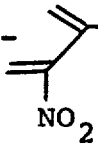 --. Column 117, Example 351, R$_1$ column, "$\oplus$" should read -- $\ominus$ --. Column 118, Example 355, R$_1$ column, that portion of the structural formula reading "CH$_2$" should read -- CH$_3$ --. Column 127, line 14, "quinolinum," should read -- quinolinium, --. Column 127, line 36, the structural formula should read

UNITED STATES PATENT AND TRADEMARK OFFICE
CERTIFICATE OF CORRECTION

PATENT NO. : 4,136,033

DATED : January 23, 1979

INVENTOR(S) : Willy Steinemann

It is certified that error appears in the above-identified patent and that said Letters Patent are hereby corrected as shown below:

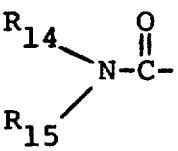

-- . Column 127, line 48, after "pyrrolidino," insert -- piperidino, --. Column 127, between lines 51 and 52 insert -- $R_{21}$ is hydrogen, alkyl of 1 to 8 carbon atoms, lower alkyl monosubstituted by lower alkoxy, hydroxy, dilower alkylamino, lower hydroxyalkylamino, dilower hydroxyalkylamino, cyano, phenyl, lower alkoxycarbonyl, piperazino, N-lower alkylpiperazino, morpholino, pyridinium$^{\oplus}$ A$^{\ominus}$ or N,N-dilower alkylhydrazinium$^{\oplus}$ A$^{\ominus}$, phenyl, chlorophenyl, lower alkylphenyl, dilower alkylaminophenyl, anilinophenyl, diphenyl, lower alkylcarbamoyl, amino, dilower alkylamino, lower hydroxyalkylamino, pyrrolidino, morpholino, N'-lower alkylpiperazino, pyridyl, tetrahydrofuryl, lower alkylthiazolyl or N-lower alkylpyrrolidinium$^{\oplus}$ A$^{\ominus}$, and A$^{\ominus}_{\oplus}$ is an anion. --. Column 128, line 40, "K" should read -- K$^{\oplus}$ --. Column 128, line 45, "A" should read -- A$^{\ominus}$ --. Column 128, line 47, "K"

UNITED STATES PATENT AND TRADEMARK OFFICE
CERTIFICATE OF CORRECTION

PATENT NO. : 4,136,033             Page 4 of 4

DATED : January 23, 1979

INVENTOR(S) : Willy Steinemann

It is certified that error appears in the above-identified patent and that said Letters Patent are hereby corrected as shown below:

should read -- $K^{\oplus}$ --. Column 128, line 61, the comma (",") should be a period (--.--). Column 128, line 62, "10" (second occurrence) should read -- 9 --. Column 129, line 26, "13" should read -- 12 --. Column 129, line 53, "comound" should read -- compound --.

Signed and Sealed this

Nineteenth Day of February 1980

[SEAL]

Attest:

SIDNEY A. DIAMOND

Attesting Officer    Commissioner of Patents and Trademarks